United States Patent [19]
Sharp et al.

[11] Patent Number: 5,528,393
[45] Date of Patent: Jun. 18, 1996

[54] SPLIT-ELEMENT LIQUID CRYSTAL TUNABLE OPTICAL FILTER

[75] Inventors: Gary D. Sharp, Boulder; Kristina M. Johnson, Longmont, both of Colo.

[73] Assignee: Regents of the University of Colorado, Boulder, Colo.

[21] Appl. No.: 275,006

[22] Filed: Jul. 12, 1994

Related U.S. Application Data

[63] Continuation-in-part of Ser. No. 62,585, May 17, 1993, abandoned, which is a continuation-in-part of Ser. No. 792,284, Nov. 14, 1991, Pat. No. 5,381,253, Ser. No. 967,218, Oct. 27, 1992, Pat. No. 5,469,279, Ser. No. 883,537, May 15, 1992, Pat. No. 5,231,521, and Ser. No. 884,644, May 15, 1992, Pat. No. 5,243,455, which is a continuation-in-part of Ser. No. 522,215, May 11, 1990, Pat. No. 5,132,826, which is a continuation-in-part of Ser. No. 429,304, Oct. 30, 1989, abandoned.

[51] Int. Cl.[6] .................. G02F 1/1335; G02F 1/03; C09K 19/02
[52] U.S. Cl. .................. 359/53; 359/73; 359/100; 359/256
[58] Field of Search .................. 359/73, 53, 260, 359/256, 100

[56] References Cited

U.S. PATENT DOCUMENTS

| | | | |
|---|---|---|---|
| 5,132,826 | 7/1992 | Johnson et al. | 359/53 |
| 5,231,521 | 7/1993 | Johnson et al. | 359/53 |
| 5,243,455 | 9/1993 | Johnson et al. | 359/73 |
| 5,247,378 | 9/1993 | Miller | 359/53 |
| 5,381,253 | 1/1995 | Sharp et al. | 359/73 |
| 5,469,279 | 11/1995 | Sharp et al. | 359/53 |

FOREIGN PATENT DOCUMENTS

90/09614  8/1990  WIPO.

OTHER PUBLICATIONS

Tarry, "Electrically Tunable Narrow band optical Filter", Electronics letters, vol. 11, No. 19, Sep. 18, 1975, pp. 471–472.
Anderson, et al., "Device physics of the soft-mode electro-optic effect," J. Appl. Phys. (1989) 66(10):4983–4995. No month.
Evans, "The Birefringent Filter," J. Optical Soc. of America (1949), 39(3):229–242. No month.
Koester, "Achromatic Combinations of Half-Wave Plates," J. Optical Soc. of America (Apr. 1959) 49(4):405–409.
Sharp et al., "Smectic Liquid Crystal Tunable Filters," Ferroelectrics (1991) 114:55–69. No month.
Sharp et al., "P–60: Color Switching Using Ferroelectric Liquid Crystals," Society for Information Display, International Symposium, Digest of Technical Papers vol. XXIV, Seattle, Washington (May 18–20, 1993), 665–668.
Steel, "Detailed Theory of the ⅛ Å Birefringent Filter," National Standards Laboratory Technical Paper No. 17, 1–18(1961), 497–512. No month.
Title et al., "Tunable birefringent filters," Optical Engineering (1981) 20(6):815–823. No month.

*Primary Examiner*—Anita Pellman Gross
*Assistant Examiner*—Ron Trice
*Attorney, Agent, or Firm*—Greenlee, Winner and Sullivan

[57] ABSTRACT

This invention provides split-element liquid crystal polarization interference filters in wide-field, bandpass, cut-on, cut-off and notch filter embodiments. The split-element filters of this invention comprise a polarization interference stage defined by a pair of polarizers. Disposed within the stage are a center retarder, and first and a second split-element retarder, the split-element retarders having equal retardances and positioned in series with and on either side of the center retarder. The retarders can be liquid crystal variable retarders or can be fixed retarders used in combination with liquid crystal retarders. Double split-element filters in passive and tunable embodiments are provided comprising, within a polarization interference stage, a center retarder, an inside pair of split-element retarders and an outside pair of split-element retarders.

51 Claims, 25 Drawing Sheets

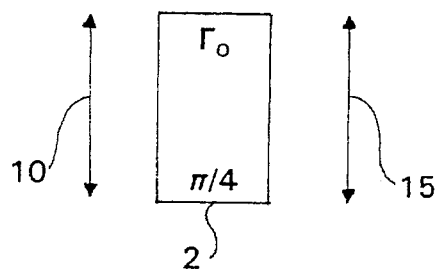
FIG. 1a  *PRIOR ART*
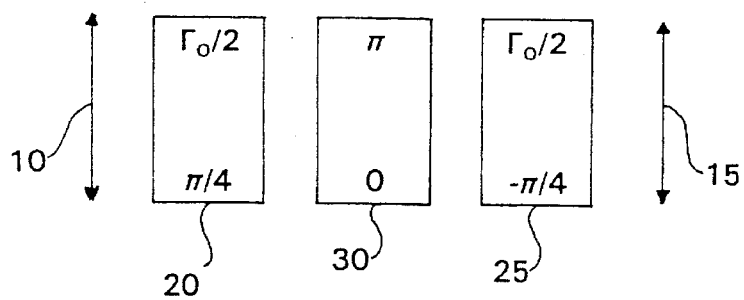
FIG. 1b  *PRIOR ART*
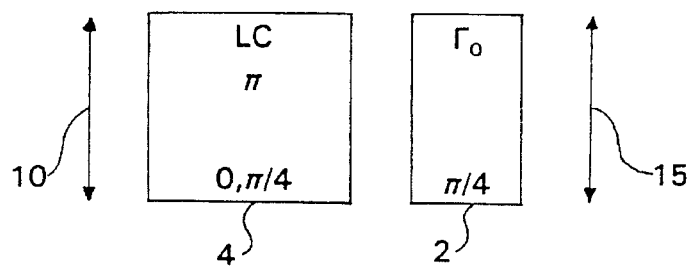
FIG. 1c  *PRIOR ART*

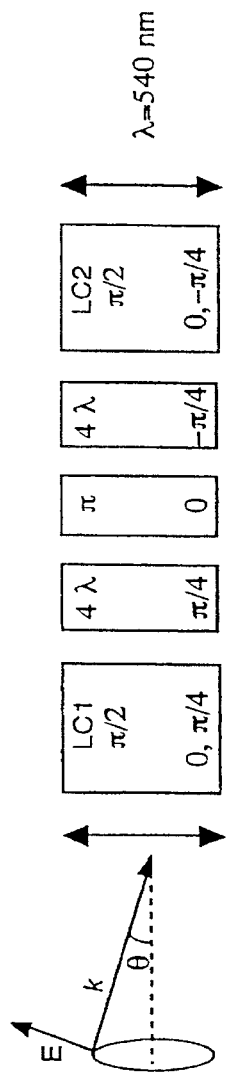
FIG. 4a
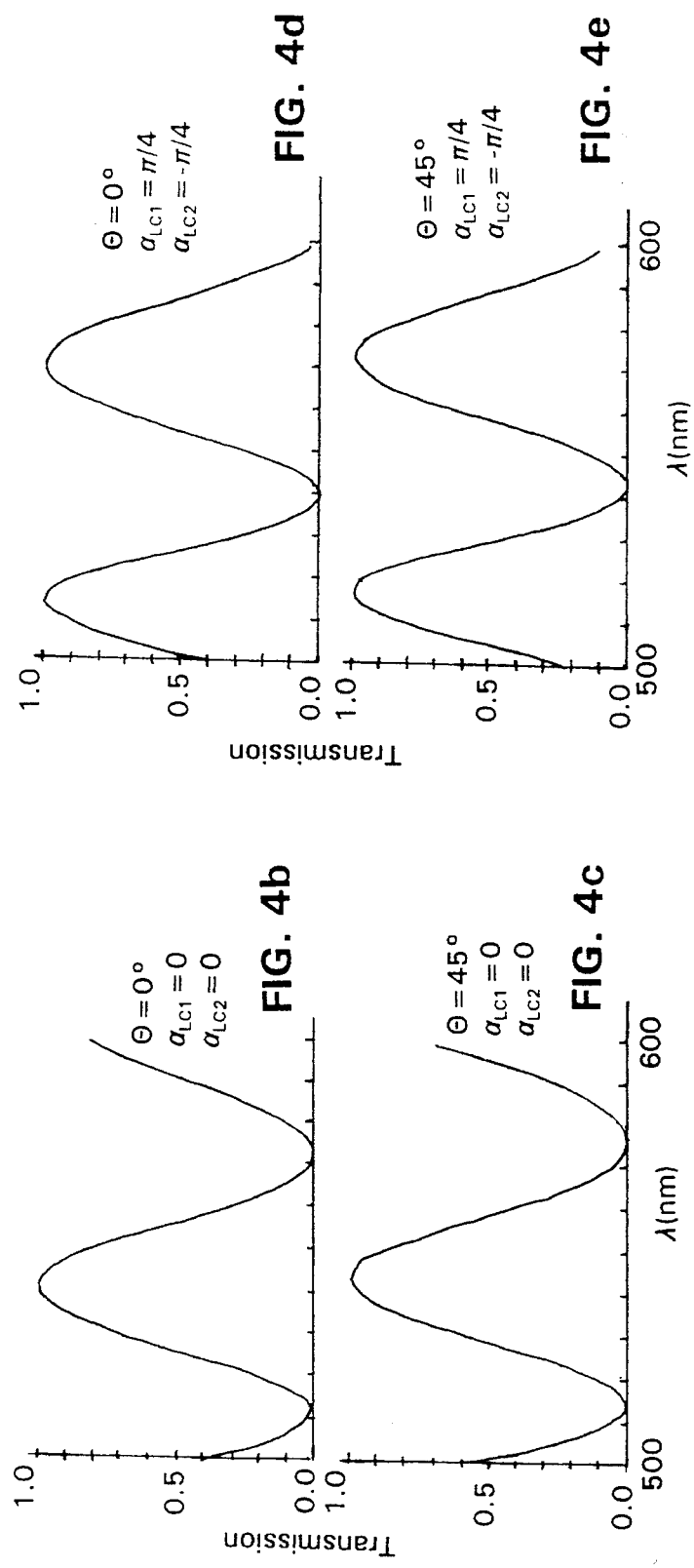
FIG. 4b
FIG. 4c
FIG. 4d
FIG. 4e

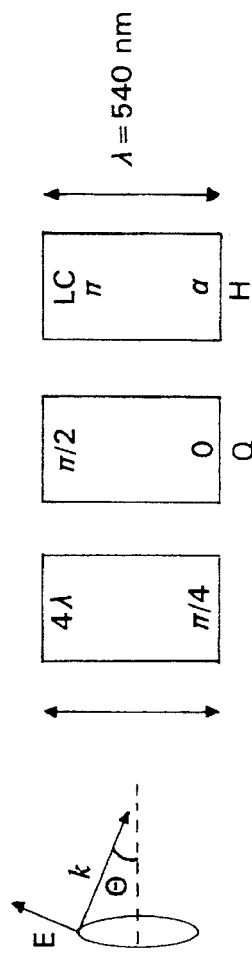
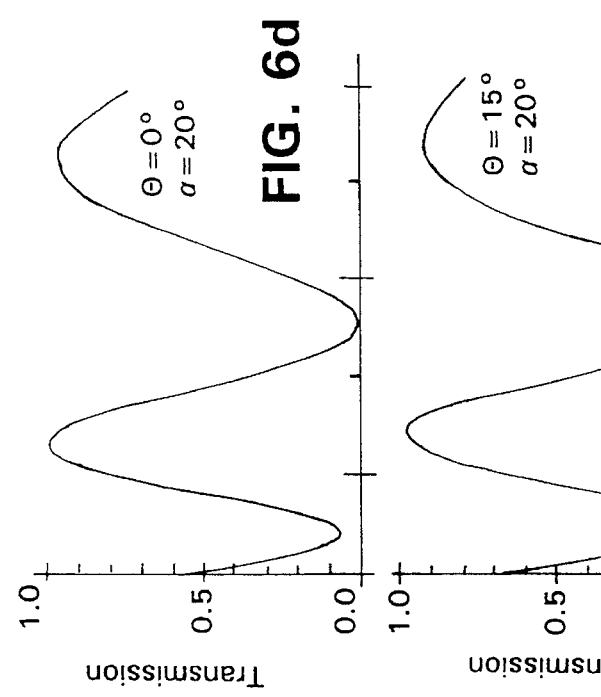
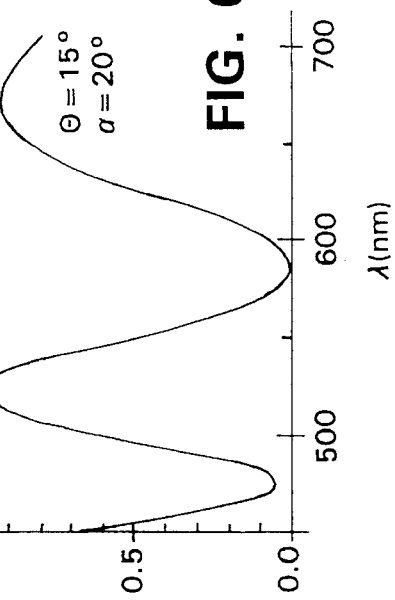
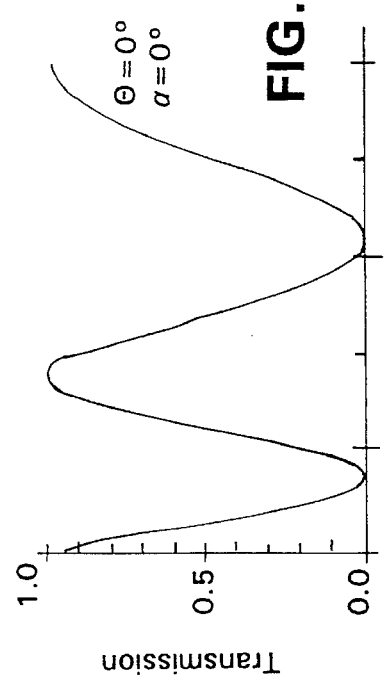
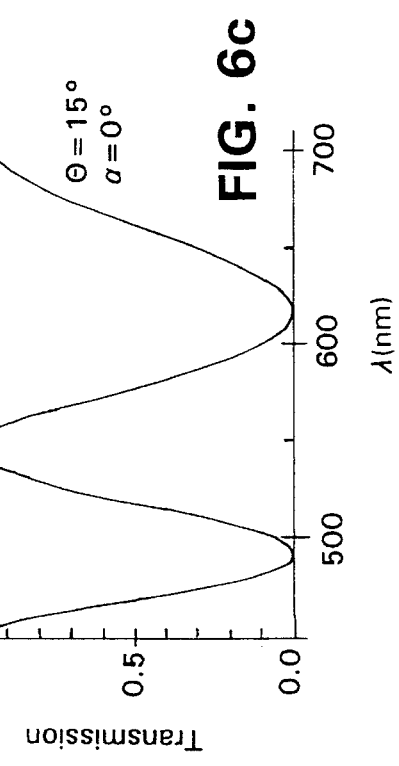

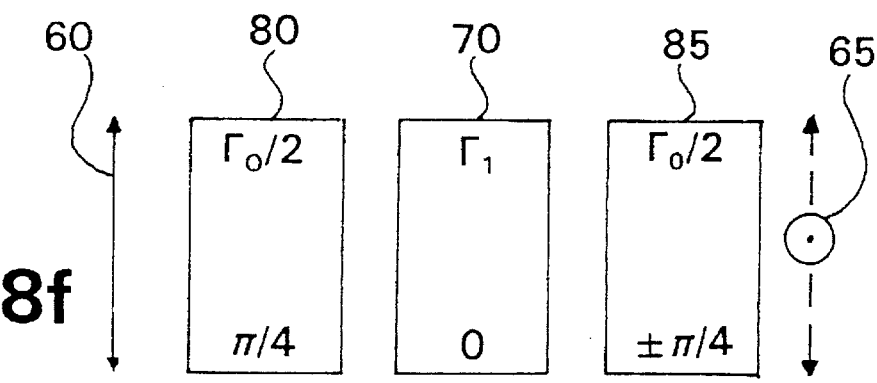
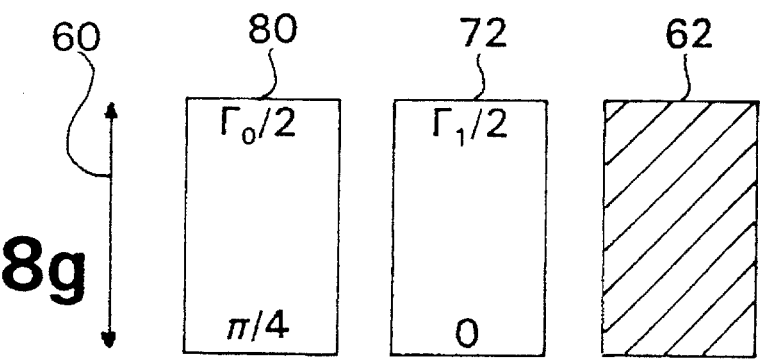

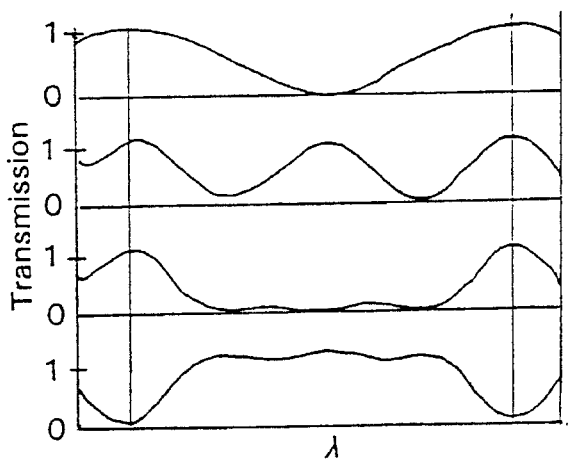
FIG. 9a
FIG. 9b
FIG. 9c
FIG. 9d
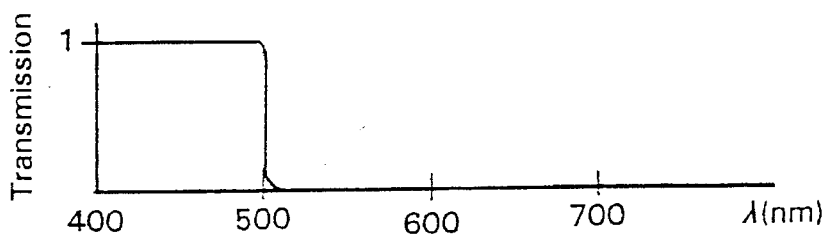
FIG. 10a
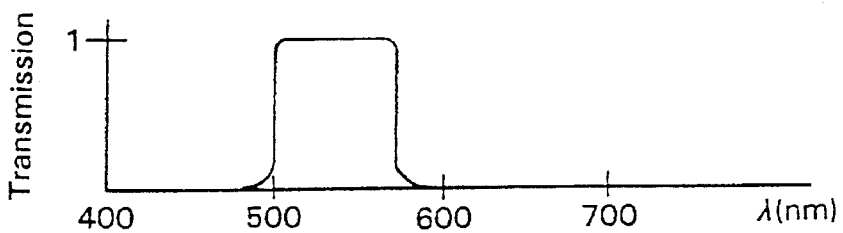
FIG. 10b
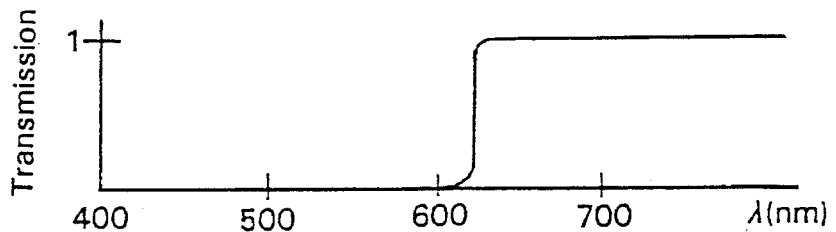
FIG. 10c

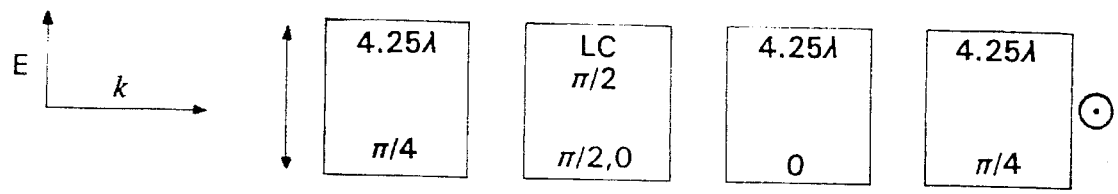
FIG. 12a   $\lambda = 540$ nm
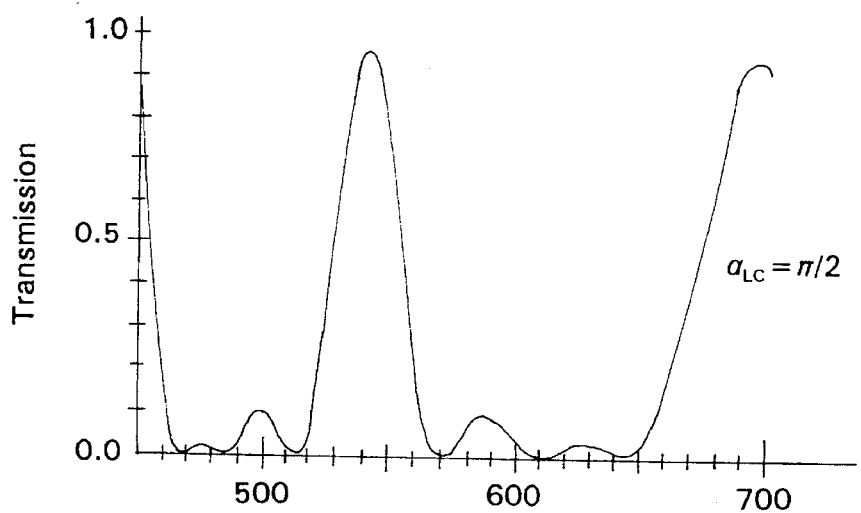
$a_{LC} = \pi/2$
FIG. 12b
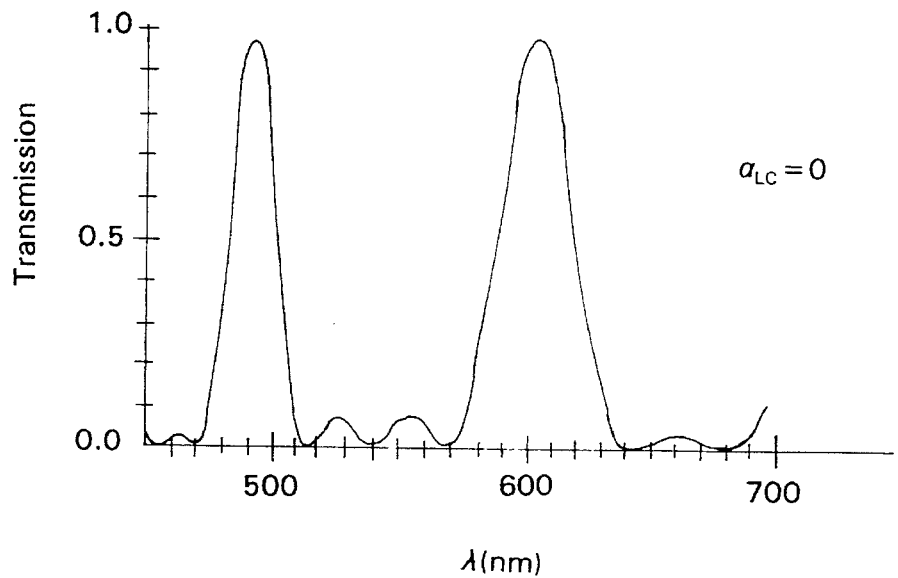
$a_{LC} = 0$
$\lambda$(nm)
FIG. 12c

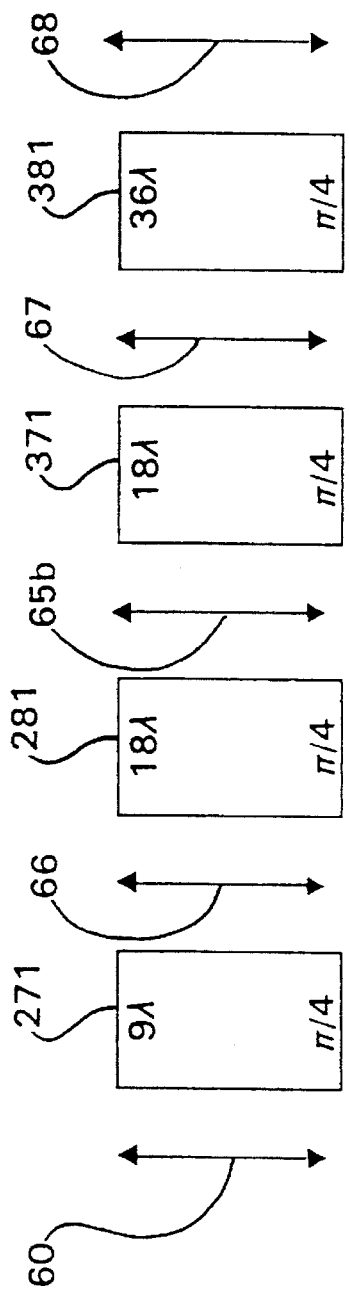
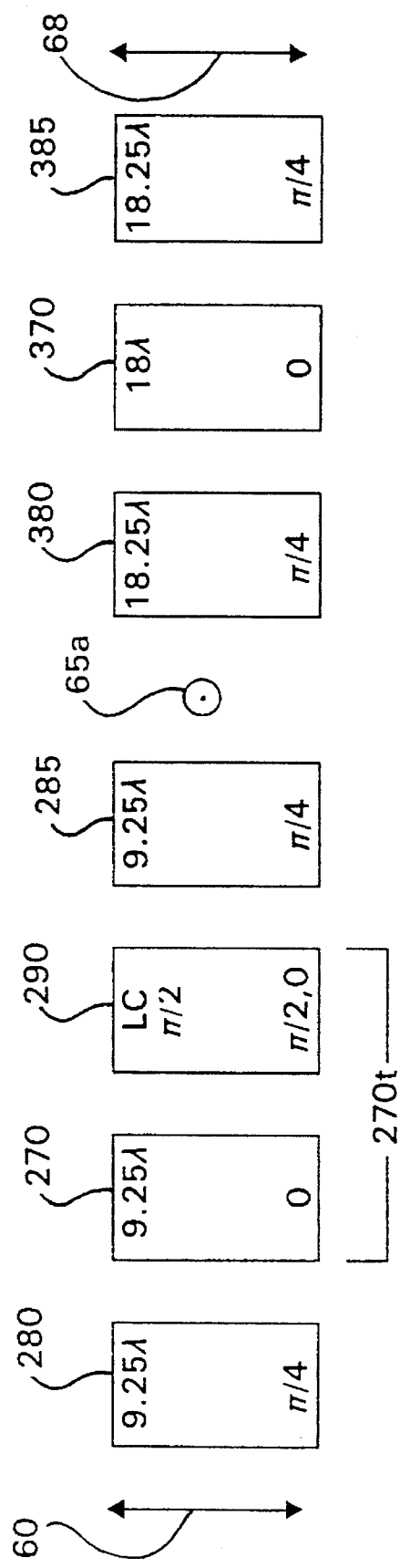
FIG. 13a
FIG. 13b

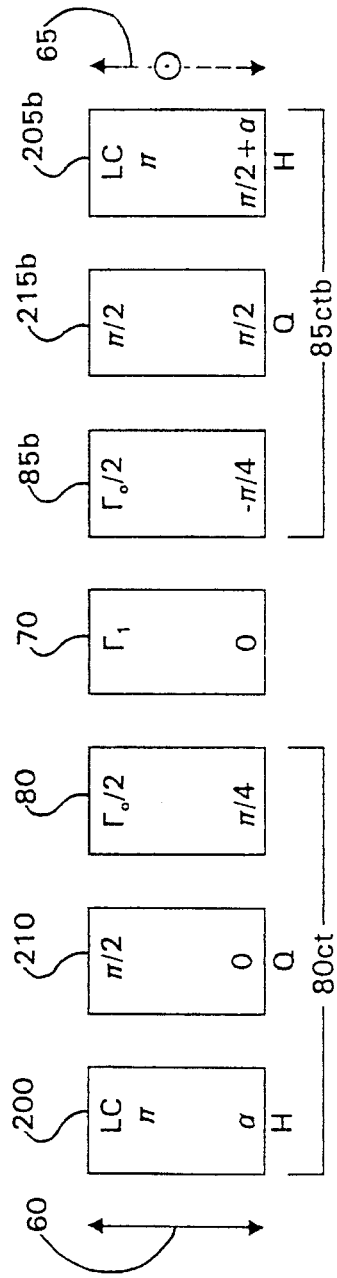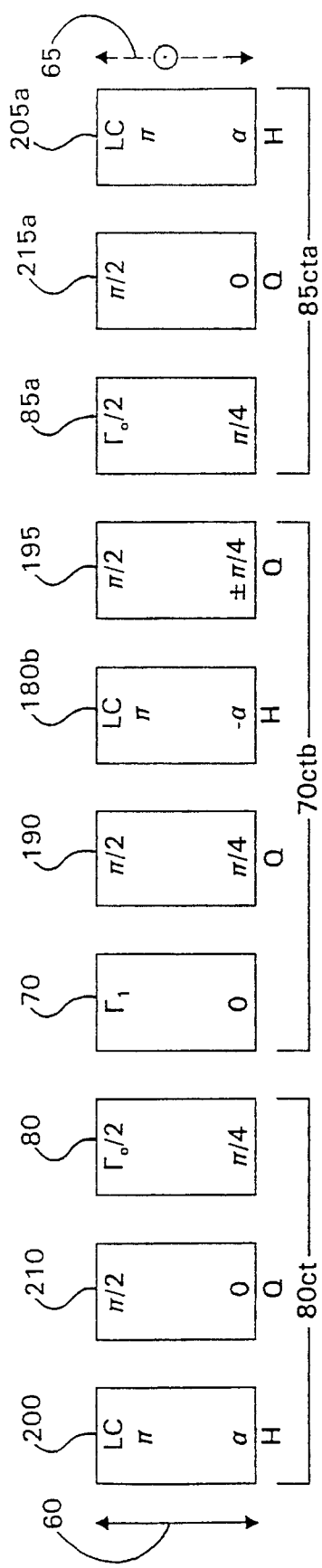
FIG. 15c
FIG. 15d

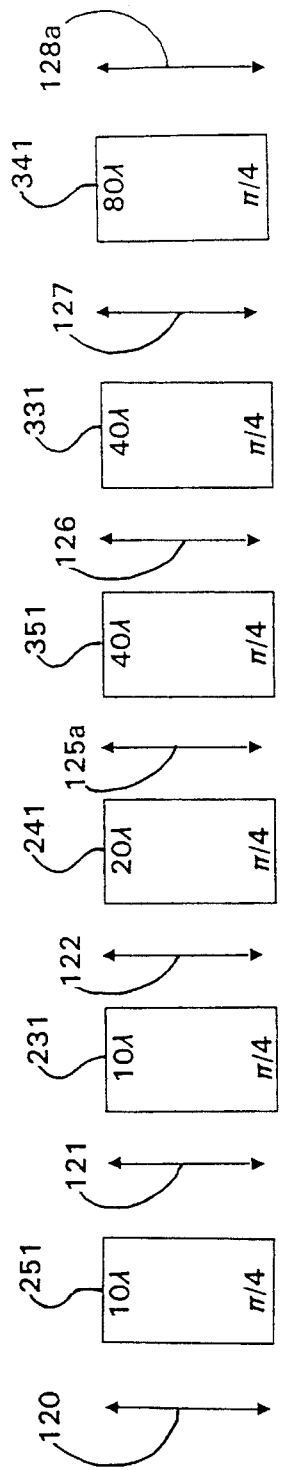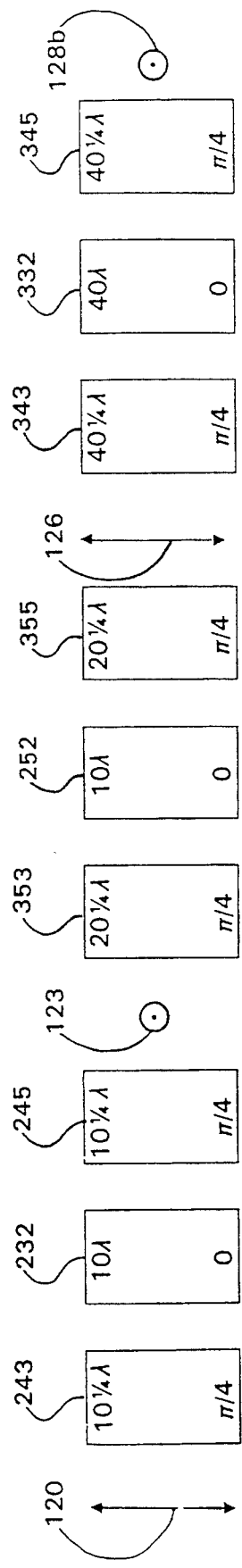
FIG. 20a                    FIG. 20b

SPLIT-ELEMENT LIQUID CRYSTAL TUNABLE OPTICAL FILTER

This application is a continuation-in-part of Ser. No. 062,585, May 17, 1993, now abandoned, which is a continuation-in-part of Ser. Nos. 792,284 (U.S. Pat. No. 5,381,253), Nov. 14, 1991, 967,218, (U.S. Pat. No. 5,469,279), Oct. 27, 1992, 883,537, May 15, 1992 (U.S. Pat. No. 5,231,521), and 884,644, May 15, 1992 (U.S. Pat. No. 5,243,455), which is a continuation-in-part of 522,215, May 11, 1990 (U.S. Pat. No. 5,132,826), which is a continuation-in-part of 429,304, Oct. 30, 1989, abandoned, all of which are incorporated in their entirety by reference herein.

FIELD OF THE INVENTION

This invention relates to liquid crystal polarization interference filters with split birefringent elements for providing wide-field, bandpass, cut-on, cut-off, and notch transmission functions.

BACKGROUND OF THE INVENTION

High throughput, high color purity, high speed tunable color filters are required to optimize color displays. While there are many color filters known in the art, none simultaneously satisfy all three criteria.

Many color filters are based on the Lyot polarization interference filter (PIF) introduced in 1933 (B. Lyot, *Comptes Rendues* 197, 1593 [1933]). The building-block for a Lyot polarization interference filter is a stage which consists minimally of a uniaxial retarder bounded by linear polarizers. The optimum configuration requires that the retarder be oriented at $\pi/4$, and that the analyzing polarizer be parallel or perpendicular to the input polarizer. The transmission function for a single filter stage with parallel polarizers is given by $$T(\lambda)=\cos^2[\pi(m+1)\lambda_o/\lambda] \quad \text{Eq. 1}$$

where $\lambda$ is the incident free-space wavelength, and the retarder is selected to be $m^{th}$ order full-wave at the design wavelength, $\lambda_o$. With crossed polarizers, the analogous $\sin^2$ transmission function is produced.

Typically, filter stages are cascaded using retarders with a common design wavelength and a differing order (m) to produce more selective transmission spectra. The Lyot filter design optimizes filter finesse (ratio of blocking bandwidth to passband width) per number of stages using a geometric relationship of retarder order (m, 2m, 4m ... ). The classic Lyot filter spectrum is a periodic sinc-function with passband profile determined primarily by the highest order retarder.

Two stages of a Lyot filter can be combined into a single stage using a split-element filter (J. W. Evans, *J. Opt. Soc. Am. 39*, 229 [1949]). To eliminate the second stage, the birefringent element of the second stage is split in half and these split elements are positioned in series with and on either side of the birefringent element of the first stage. The polarizers are crossed, the center element is oriented parallel to either polarizer, and the split elements are oriented at $+\pi/4$ and $-\pi/4$. Wide-field versions of the Lyot filter can also be constructed.

Electronically tunable Lyot-type polarization interference filters using the variable birefringence of homogeneously aligned nematic liquid crystals have been described. Continuous tunability is obtained, but response times of nematic liquid crystals are slow, on the order of 1–100 ms.

Planar aligned smectic liquid crystals, including ferroelectric liquid crystals (FLCs), provide microsecond response times. However, in contrast to nematic liquid crystals, application of an electric field to planar aligned smectic liquid crystals rotates the orientation of the optic axis but does not vary the retardance. Nonetheless, the inventors have previously demonstrated polarization interference color filters using smectic liquid crystals (G. Sharp et al., *Opt. Lett.* 16, 875 [1991]; K. Johnson and G. Sharp in U.S. Pat. Nos. 5,132,826 [1992], 5,231,521 [1993] and 5,243,455 [1993]).

Although the smectic liquid crystal Lyot filters of the Johnson and Sharp patents are high speed, they cannot be simultaneously both high throughput and high color purity. An aspect of the present invention is the recognition of the tradeoff between throughput and color purity in a Lyot-type design. The transmission of a single stage filter is described in Eq. 1. Differentiating Eq. 1 reveals that the slope of the transition band increases almost linearly with retarder order, which is beneficial to color purity. However, the pass-band-full-width decreases almost inversely with retarder order, decreasing throughput. This tradeoff illustrates that Lyot stages are not optimum for implementing color filters.

SUMMARY OF THE INVENTION

This invention provides split-element tunable color filters with high throughput, high color purity, and high speed. The high throughput color filter of this invention is an innovative modification of narrow bandpass split-element filters. The birefringent elements are the same but the polarizers are parallel instead of crossed. This creates the inverse spectrum from the bandpass filter, i.e., the transmittance is one minus the bandpass filter transmittance. Thus, instead of a blocking filter with narrow transmission peaks, the high throughput filter has broad transmission bands with sharp cutoffs. This configuration was considered and rejected by Evans as not being as useful as a bandpass filter. However, it is an aspect of this invention to recognize the value of the inverse, or notch filter, spectrum for high throughput color displays. The high throughput filter of this invention is tuned by liquid crystal cells. Any of the three retarders can be liquid crystal cells or fixed retarders used in combination with liquid crystal variable retarders or with liquid crystal rotatable retarders.

In addition to the high throughput filter, this invention further provides novel split-element polarization interference filters in wide-field, bandpass, cut-on, cut-off and notch filter embodiments. The split-element filters of this invention comprise a PIF stage formed by a first polarizer and a second polarizer, oriented parallel or perpendicular to each other. Within the stage are first and second split-element retarders of equal retardance, oriented parallel or crossed with respect to each other and at $\pm\pi/4$ with respect to the first polarizer, and a center retarder unit comprising one or more retarders having a composite retardance oriented parallel or perpendicular to said first polarizer. The retarders can be liquid crystal cells or can be fixed retarders used in combination with liquid crystal variable retarders or with liquid crystal rotatable retarders.

Wide-field filters of this invention are a special case of the split-element filter wherein the center retarder unit provides a half-wave retardance, and wherein the optic axes of the split elements are orthogonal to each other. Because the transmission of the wide-field filters of this invention is relatively insensitive to the angle of incidence of the optical beam, they are advantageous in applications such as fluorescence imaging which employ large numerical apertures.

This invention further provides tunable split-element bandpass filters. In these filters, the transmission function of a two-stage filter is obtained in a single stage with only two polarizers, reducing the number of polarizers and significantly reducing absorption losses. In the bandpass configuration of the split-element filter, the first and second polarizers are crossed. This is in contrast to the high throughput, high color purity filter of this invention wherein the polarizers are parallel.

Double split-element filters are also provided. These filters comprise a pair of parallel or crossed polarizers and, positioned between the polarizers, outside split elements with optic axes oriented at $\pm\pi/4$ to the input polarizer, inside split elements oriented parallel or perpendicular to the input polarizer, and a center retarder oriented at $\pm\pi/4$ to the input polarizer. These filters do not produce the spectrum of a three-stage geometric progression Lyot filter. They can, however, reproduce a three-stage Lyot filter with two stages having a geometric progression of retarder order and one contrast stage having retarder order equal to one of the other two stages. The double split-element filters can be designed to produce cut-on and cut-off filters with high throughput and sharp transitions advantageous for color generation. The double split-element filters can comprise purely passive elements or can be mechanically, thermally, or opto-electronically tuned. The opto-electronic tuning elements can employ nematic or smectic liquid crystal cells.

The split-element filters of this invention include both transmission and reflection configurations. The retarders can be related in Lyot-type or non-Lyot-type proportions. The split-element bandpass and notch filters can also be implemented in wide-field configurations. The filters can utilize purely passive elements, active and passive retarders together, or all active elements. Active elements include liquid crystal cells. They can be nematic liquid crystal cells which provide analog retardation tuning with millisecond response times. They are preferably smectic liquid crystal cells which provide discrete or continuous opto-electronic modulation of the orientation of the optic axis (planar aligned cells) or modulation of the retardance (homeotropically aligned cells) with microsecond tuning times. The smectic liquid crystals used in this invention include SmC*, SmA*, DHF, antiferroelectric liquid crystals, and achiral ferroelectric liquid crystals.

This invention specifically provides discretely tunable split-element filters with planar aligned SmC* tuning elements as well as analog filters with planar aligned SmA* tuning elements. The analog tuning element of the filters of this invention comprises a SmA* half-wave retarder positioned between two quarter-wave retarders or between one quarter-wave retarder and a polarizer. In these configurations, rotation of the optic axis of the SmA* cell produces analog variable retardance and thereby analog tuning of the transmission spectrum.

BRIEF DESCRIPTION OF THE DRAWINGS

FIG. 1, comprising FIGS. 1a–1c, illustrates a single stage passive Lyot filter (FIG. 1a) and a wide-field embodiment (FIG. 1b). FIG. 1c is a liquid crystal discretely tunable Lyot stage.

FIG. 2, comprising

FIG. 3, comprising

FIG. 4, comprising FIGS. 4a–4e, shows a single-stage, discretely-tunable, wide-field Lyot filter (FIG. 4a) and the transmission of the filter in the off-state with light incident at 0° (FIG. 4b) and at 45° (FIG. 4c), and the transmission of the filter in the on-state with light incident at 0° (FIG. 4d) and at 45° (FIG. 4e).

FIG. 5, comprising

FIG. 6, comprising FIGS. 6a–6e, is a continuously-tunable liquid crystal Lyot filter (FIG. 6a) and the transmission through the filter as a function of liquid crystal tilt angle, $\alpha$, and angle of incidence, $\Theta$ (FIGS. 6b–6e).

FIG. 7, comprising

FIG. 8, comprising FIGS. 8a–8g, shows a passive two-stage Lyot filter (FIG. 8a) and passive split-element Lyot filters with crossed split elements and crossed polarizers (FIG. 8b), with crossed split elements and parallel polarizers (FIG. 8c), with parallel split elements and crossed polarizers (FIG. 8d), with parallel split elements and parallel polarizers (FIG. 8e), and in the generic form (FIG. 8f). FIG. 8g is a reflection mode embodiment of FIG. 8e.

FIG. 9, comprising FIGS. 9a–9d, illustrates the transmission of a first Lyot stage (FIG. 9a), a second stage (FIG. 9b), a split-element filter which combines the two stages (FIG. 9c) and a split-element notch filter (FIG. 9d).

FIG. 10, comprising FIGS. 10a–10c, is the optimum transmission of a three color filter with primary color bands in the blue (FIG. 10a), green (FIG. 10b) and red (FIG. 10c).

FIG. 11, comprising

FIG. 12, comprising FIGS. 12a–12c, is a tunable split-element filter (FIG. 12a) and the transmission through the filter with the liquid crystal cell in the off-state (FIG. 12b) and in the on-state (FIG. 12c).

FIG. 13, comprising FIGS. 13a–13b, illustrates a passive four-stage Lyot filter with one contrast stage (FIG. 13a) and a tunable two-state, two-stage split-element version of the filter (FIG. 13b).

FIG. 14, comprising

FIG. 15, comprising FIGS. 15a–15d, illustrates continuously tunable liquid crystal split-element filters with a tunable center retarder (FIG. 15a), with tunable split elements (FIGS. 15b and 15c), and with both tunable center and split elements (FIG. 15d).

FIG. 16, comprising

FIG. 17, comprising

FIG. 18, comprising

FIG. 19, comprising

FIG. 20, comprising FIGS. 20a–20c, illustrates a six-stage passive Lyot filter (FIG. 20a), a three-stage split-element version of the filter (FIG. 20b), and a two-stage double split-element version of the filter (FIG. 20c).

FIG. 21, comprising

DETAILED DESCRIPTION OF THE PREFERRED EMBODIMENTS

Figure 2A:
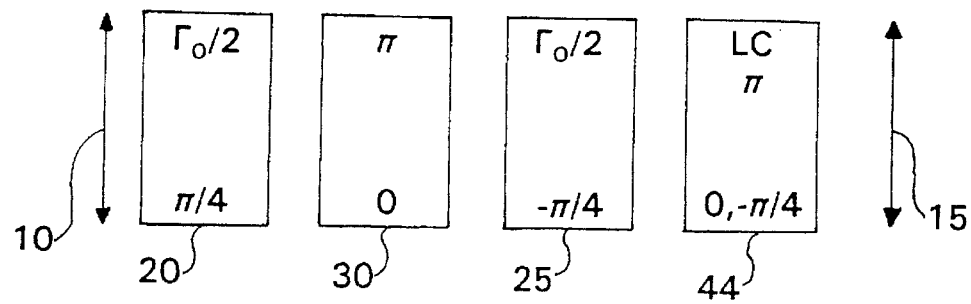
FIGS. 2a–2d, illustrates wide-field, discretely-tunable filters with a single liquid crystal tuning element (FIG. 2a), with liquid crystal cells outside of the split retarders (FIG. 2b), inside the split retarders (FIG. 2c), and on both sides of the split retarders (FIG. 2d).

In the drawings, like numbers indicate like elements and the same number appearing in more than one drawing refers to the same feature. The elements of the filters of this invention are optically connected in series. The orientation of a polarizer refers to the orientation of the transmitting axis with respect to the initial polarizer of the filter and the orientation of a birefringent element refers to the orientation, α, of the principal optic axis of that element, also with respect to the initial polarizer. Orientations are defined in a plane perpendicular to the light propagation axis. The term "crossed" refers to elements oriented at 90° to one another, i.e. orthogonal, i.e. perpendicular. In the illustrations of birefringent elements, the number in the top of the box is the retardance and the number in the bottom is the orientation in radians. Note that a π retardance is equal to a half-wave (λ/2) retardance. For elements which can be opto-electronically switched between two states, the two orientations are listed in the bottom of the box and are separated by a comma. The first orientation is designated the off-state and the second the on-state. Typically, the off-state gives maximum transmission at the design wavelength. When two alternative orientations can be used for two different embodiments, they are listed on separate lines in the bottom of the box or, when appropriate, as "±" an angle. The term "fixed" birefringent element refers to elements with non-variable orientation and retardance. Polarizers are represented by an arrow for vertical orientation and a circled dot for horizontal orientation, perpendicular to the plane of the paper. When a polarizer can be oriented either vertically or horizontally, it is illustrated with a dashed vertical arrow and a circled dot. Liquid crystal (LC) elements are identified at the top of the box. To facilitate understanding of continuously tunable filters, quarter-wave and half-wave plates are identified with a "Q" or "H" under the box.

The term "reflection of polarization about an axis" is used for rotation of polarization from an orientation at an angle θ with respect to the axis to an orientation at –θ.

The term "compound retarder" is used for a group of two or more retarders optically coupled in series. The composite retardance of a compound retarder is the net retardance of the group of retarders and can be obtained mathematically from the product of the Jones matrices of the individual retarders within the group. The composite retardance is characterized by an orientation and a retardance.

The basic stage of a Lyot polarization interference filter is illustrated in FIG. 1a and is described by Eq. 1. It consists of retarder 2 with retardance $\Gamma_o$ oriented at π/4 to polarizes 10 and 15. Typically the retarder is selected to be a $m^{th}$ order full-wave retarder at a chosen wavelength. The single stage Lyot filter can alternatively have crossed polarizers. This provides a $\sin^2$ transmission function instead of the $\cos^2$ function of Eq. 1.

The wide-field Lyot filter is illustrated in FIG. b. Retarder 2 of the Lyot filter is split into retarders 20 and 25, each with fixed retardance $\Gamma_o/2$. The retardance of the split elements is equal. Retarder 25 is oriented at –π/4 so that the two elements are crossed. Half-wave plate 30, oriented parallel to polarizer 10, is inserted between the split elements to reflect the polarization about the axis of input polarization. In the wide-field filter, the retardance is less sensitive to the angle of light incidence than in the simple filter of FIG. 1a. Half-wave retarder 30 is preferably achromatic over the wavelength range of incident light.

FIG. 1c shows the previously developed liquid crystal discretely tunable Lyot filter (K. Johnson and G. Sharp, U.S. Pat. No. 5,132,826, [1992]). Liquid crystal half-wave retarder 4 is opto-electronically switchable between orientations of 0, where it is parallel to input polarizer 10 and does not affect the polarization, and π/4, where it is parallel to retarder 2. In the π/4 orientation the liquid crystal cell adds its retardance to full-wave retarder 2. For a half-wave liquid crystal retarder, this shifts the transmission maxima to the wavelengths of the former minima and vice-versa.

The present invention provides tunable wide-field liquid crystal filters. In one embodiment of this invention, split elements 20 and 25 (FIG. 1b) are liquid crystal variable retarders with applied electric field dependent retardance $\Gamma_o/2$. They can, for example, be nematic liquid crystal cells or homeotropically aligned smectic liquid crystal cells. In the homeotropically aligned geometry (smectic layers parallel to the cell walls), application of an electric field parallel to the cell walls provides variable retardation of light propagating normal to the cell walls. In an exemplary application, $\lambda_o=8\lambda$ and so the split elements are 4λ retarders. Since the switching speed of nematic liquid crystal cells decreases as cell thickness increases, another embodiment of this invention employs split element retarders which are comprised of liquid crystal variable retarder cells in combination with passive retarders.

A wide-field liquid crystal filter of this invention which employs a liquid crystal rotatable retarder rather than a liquid crystal variable retarder is illustrated in FIG. 2a. As in the passive wide-field filter, it comprises polarizers 10 and 15, split-elements 20 and 25, and half-wave retarder 30. Element 30 can be any element which reflects the polarization about the axis of input polarization. It is preferably a zero-order or achromatic half-wave retarder. In addition, the filter includes smectic liquid crystal half-wave retarder 44. The liquid crystal cell has fixed retardance and the orientation can be opto-electronically switched between 0 and –π/4. It is preferably a zero-order retarder. When the liquid crystal cell is oriented at 0, it is parallel to the adjacent polarizer and does not affect the filter transmission. When switched to $-\pi/4$, the retardance adds to the split-element retardance and modifies the filter transmission. In the illustrated embodiment the liquid crystal adds a half-wave of retardance, reversing the locations of transmission maxima and minima. In alternative embodiments, other retardances can be employed to shift the spectrum by different amounts. In the illustrated embodiment the polarizers are parallel. As in the case of a basic Lyot stage, crossed polarizers can be used.

Figure 2B:
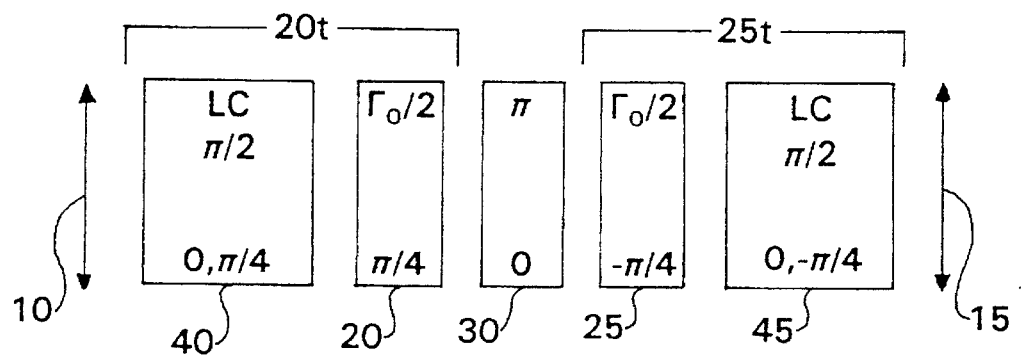

FIG. 2b illustrates a second embodiment of the discretely-switchable, wide-field liquid crystal filter of this invention. Tunable split-element units 20t and 25t include liquid crystal cells 40 and 45 in combination with passive retarders 20 and 25. The term retarder "unit" refers to a single retarder or a group of retarders which function together as a split-element retarder or a central retarder. The liquid crystal cells of this embodiment have fixed retardance and switchable orientation and can be, for example, planar aligned SmC* cells. The retardances of the liquid crystal cells are equal so that the split elements remain matched. In the off-state the liquid crystal cells are oriented at 0, parallel to polarizers 10 and 15, and do not modify the retardances of the passive split elements. Equivalently, one or both of the liquid crystal cells can be oriented at $\pi/2$ in the off-state. In the on-state cell 40 is switched to $\pi/4$ and cell 45 is switched to $-\pi/4$, where they are parallel to the passive split retarders. The total retardance of each of the split elements is the sum of the liquid crystal cell retardance and the passive element retardance. In the illustrated embodiment, the liquid crystal cells are quarter-wave plates. The two liquid crystal cells add a total of a half-wave of retardance to the filter which reverses the spectral positions of the transmission maxima and minima. For switching by less than a half-wave, other retardances of the liquid crystal cells can be employed.

In the FIG. 2b embodiment of the tunable wide-field filter, the liquid crystal tuning elements are symmetrically added to the split elements. In contrast, the embodiment of FIG. 2a employs only one liquid crystal cell. Typically, wide-field devices are utilized to compensate for the angle sensitive retardance shift of high-order retarders 20 and 25. However, computer modeling has shown that the asymmetric addition of a zero-order FLC retarder, as shown in FIG. 2a, provides the same field of view as the symmetric addition of two FLC retarders, as shown in FIG. 2b.

Figure 2C:
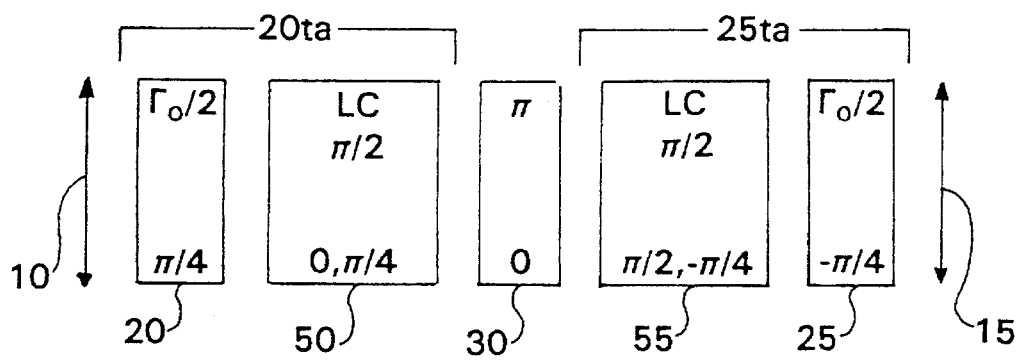

An alternative position of the liquid crystal cells is illustrated in FIG. 2c. Liquid crystal cells 50 and 55 are positioned between passive split element units 20 and 25 and half-wave plate 30 to form tunable split element units 20ta and 25tb. In the off-state they have orthogonal orientations of 0 and $\pi/2$ so they do not change the light polarization within the filter. Were the liquid crystal cells both oriented at 0 in the off-state, as in the embodiment of FIG. 2b wherein they are positioned outside of the split elements, the retardance of the half-wave plate would be modified. With orthogonal orientations in the off-state the net retardance of the half-wave plate is unchanged. In the on-state they are oriented parallel to the passive split elements at $\pi/4$ and $-\pi/4$ and the liquid crystal cell retardance adds to the passive split element retardance. This filter is equivalent in function to the filter of FIG. 2b.

Figure 2D:
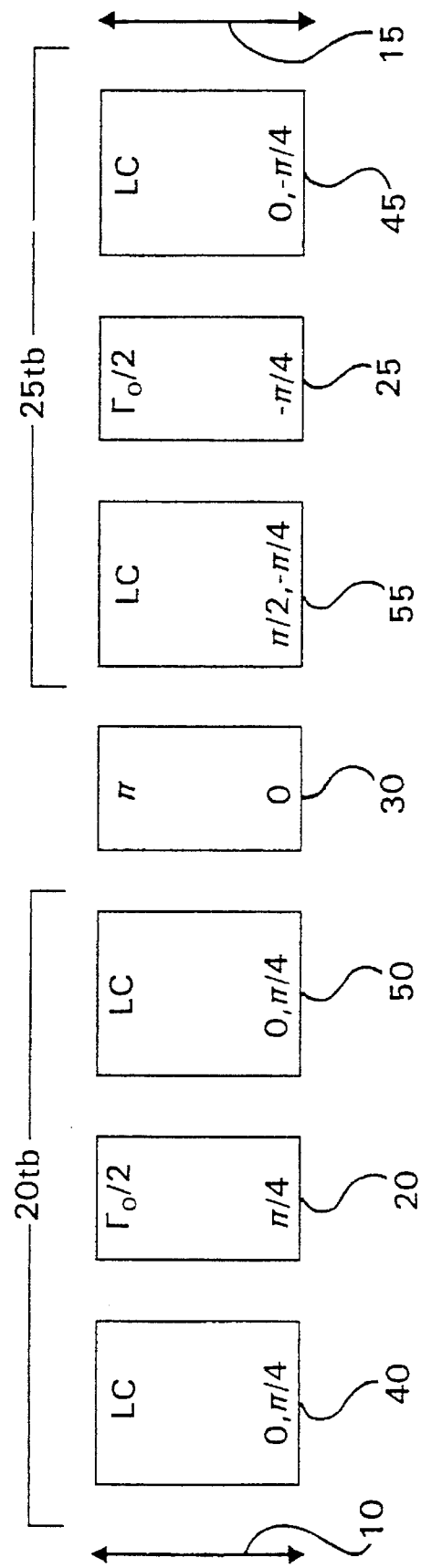

For four state tuning, liquid crystal tuning elements can be placed both inside and outside of the split retarders, as illustrated in FIG. 2d. As in the above examples, the liquid crystal cells are oriented so that the filter retardance is not affected in the off-state and the liquid crystal cells are aligned with the split retarders in the on-state. The outside cells 40 and 45 are switched synchronously and the inside cells 50 and 55 are switched synchronously so that the total retardance of the tunable retarder units 20tb and 25tb is always equal. The inside and outside pairs of liquid crystal cells can be independently switched. If, for example, the outer liquid crystal cells have retardances $\pi/2$ and the inner liquid crystal cells have retardances $\pi/4$, the transmission spectrum can be shifted by $\lambda/4$, $\lambda/2$, and $3\lambda/4$.

Figure 3A:
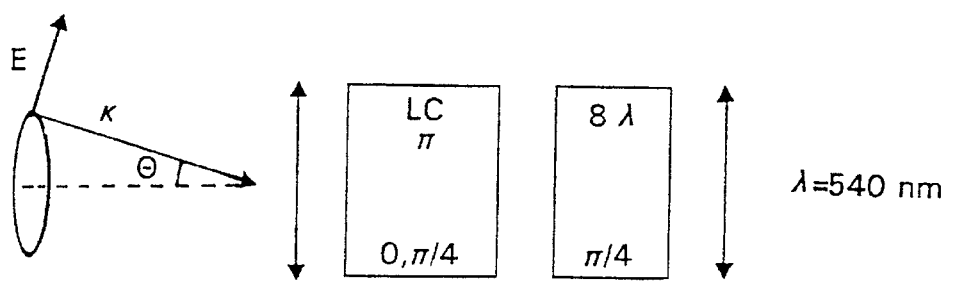
FIGS. 3a–3c, shows a single-stage, discretely-tunable Lyot filter (FIG. 3a) and the transmission of the filter with light incident at 0° (FIG. 3b) and at 10° (FIG. 3c).
Figure 3B:
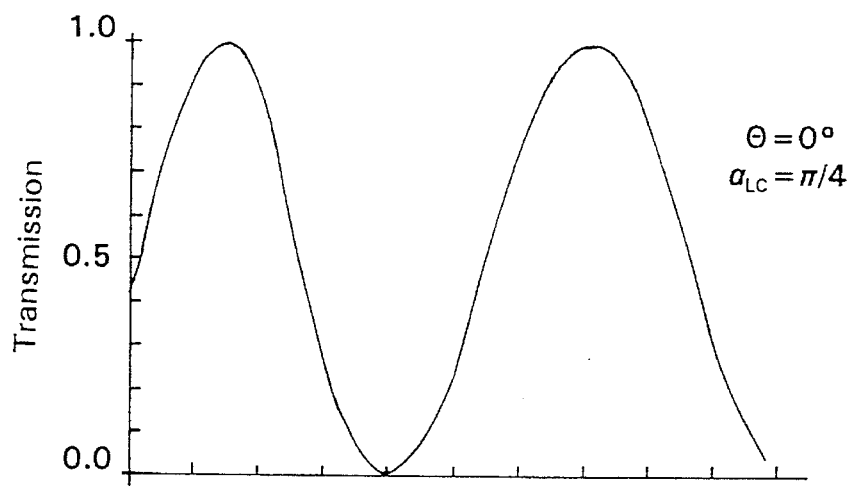
Figure 3C:
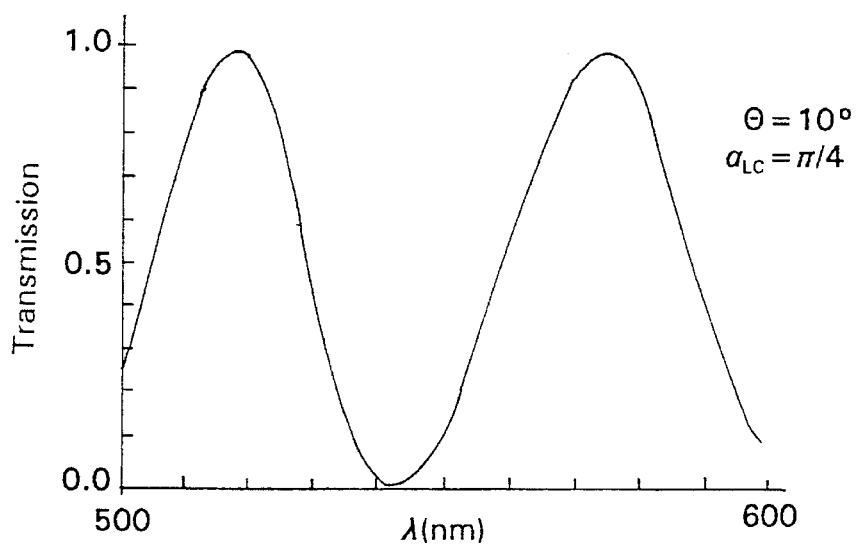

FIGS. 3 and 4 show the wide-field capability of a filter of this invention compared to the simple liquid crystal Lyot filter. The simple liquid crystal Lyot filter of FIG. 3a contains an $8\lambda$ waveplate for $\lambda=540$ nm and a liquid crystal half-wave plate for switching. For light incident at 10° the null point in the on-state is shifted by 3 nm to 543 nm (FIG. 3c), compared to 548 nm for light incident at 0° (FIG. 3b).

For comparison, the wide-field filter of this invention is illustrated in FIG. 4a. In the off-state the transmission is a $\cos^2(4\pi\lambda_o/\lambda)$ function with a transmission maximum at 540 nm. In the on-state (FIG. 4d) the two liquid crystal cells add a half-wave of retardance to the filter so that the transmission function is shifted by a half-wave and there is a null point at 540 nm. When light is received at an angle of incidence of 45°, the maximum transmission point in the off-state shifts from 540 nm (FIG. 4b) to 543 nm (FIG. 4c), and the null point in the on-state shifts from 540 nm (FIG. 4d) to 543 nm (FIG. 4e). The simple Lyot filter of FIG. 3 suffers comparable shift with an incident angle of only 10°.

In addition to the discrete tuning filters illustrated above, the wide-field filters of this invention can be continuously tuned using, for example, SmA* planar aligned liquid crystal cells. Application of an electric field with planar electrodes continuously rotates the optic axis of the liquid crystal cell but does not change the retardance. The term "continuous rotation" refers to analog rotation, typically between two limiting tilt angles and not necessarily over a full $2\pi$ rotation. To achieve variable retardation, the liquid crystal cell can be disposed between two quarter-wave plates, as described in U.S. patent application Ser. No. 792,284 filed Nov. 14, 1991. With parallel quarter-wave plates oriented at $\pi/2$ to the incident polarization and a rotatable half-wave plate at angle $\alpha$, the quarter-half-quarter (QHQ) sequence is equivalent to a retarder at $\pi/4$ with variable retardance $4\alpha$. With quarter-wave plates at 0 the QHQ device is equivalent to a retarder at $-\pi/4$. In Lyot filters, the second quarter-wave plate can be replaced by a polarizer.

Figure 5A:
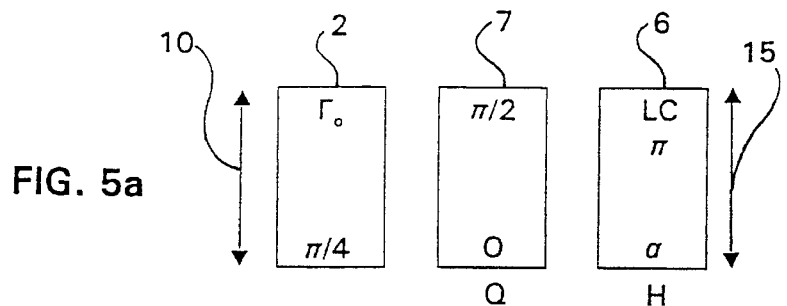
FIGS. 5a–5d, illustrates a continuously-tunable, liquid crystal Lyot filter (FIG. 5a), and continuously-tunable, wide-field Lyot filters with an outside liquid crystal retarder (FIG. 5b), with a center liquid crystal retarder (FIG. 5c) and a compound center liquid crystal retarder (FIG. 5d).

The continuously tunable Lyot filter (Johnson and Sharp, U.S. Pat. No. 5,132,826 [1992]) is illustrated in FIG. 5a. It between polarizers 10 and 15. Tuning is provided by SmA* liquid crystal half-wave plate 6 in combination with passive quarter-wave plate 7. An embodiment with $\Gamma_o=4\lambda$ is illustrated in FIG. 6a. Rotation of the optic axis $\alpha$ of the liquid crystal cell continuously tunes the transmission. At normal incidence, the transmission maximum with $\alpha=0°$ is 540 nm (FIG. 6b) and when $\alpha=20°$ the maximum is tuned to 515 nm (FIG. 6d). For light incident at 15° the transmission maxima are red-shifted to 547 nm for $\alpha=0°$ (FIG. 6c) and 521 nm for $\alpha=20°$ (FIG. 6e).

Figure 5B:
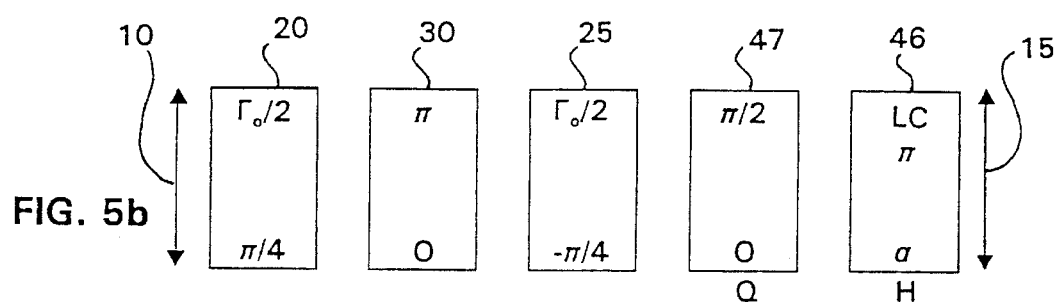

The continuously tunable wide-field filter of this invention, illustrated in FIG. 5b, reduces the dependence of the transmission on the angle of incidence. It comprises polarizers 10 and 15 and crossed split-element passive retarders 20 and 25 on either side of half-wave plate 30. The split elements are tuned by rotatable liquid crystal half-wave retarder 46 in combination with quarter-wave retarder 47. As in the discretely tuned filter, the asymmetric placement of the liquid crystal cell does not reduce the field of view when it is a zero order retarder. In an alternate embodiment of this invention, tuning elements 47 and 46 can be replaced by a nematic liquid crystal variable retarder or a homeotropically aligned smectic liquid crystal variable retarder.

Figure 5C:
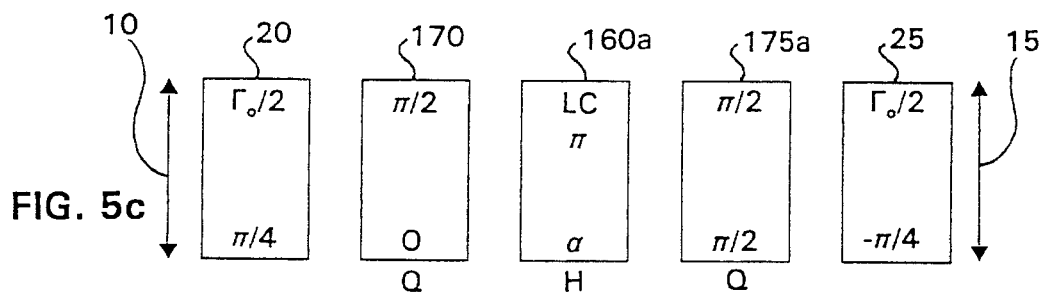

Another embodiment of the continuously tunable wide-field filter is illustrated in FIG. 5c. It also comprises polarizers 10 and 15 and split-element retarders 20 and 25. Between the split elements is the tuning device comprised of crossed quarter-wave plates 170 and 175a and continuously rotatable liquid crystal half-wave plate 160a. Recall that the wide-field filter utilizes a center half-wave plate parallel to the entrance polarizer. Jones matrix analysis illustrates how this filter provides the wide-field configuration. The center sequence of wave plates is modeled with Jones matrix algebra as the product of the Jones matrices, W(retardance, orientation), for each of the three wave plates. For elements 170, 160a and 175a, Jones algebra shows that $$W(\pi/2,0)\ W(\pi,\alpha)\ W(\pi/2,\pi/2)$$
$$= W(-4\alpha,\pi/4)\ W(\pi,0)$$
$$= W(-2\alpha,\pi/4)\ W(\pi,0)\ W(-2\alpha,-\pi/4).$$

Eq. 2

This shows that the sequence is equivalent to a variable retardance of $-4\alpha$ at $\pi/4$ in combination with a half-wave plate at 0. It is also equivalent to a half-wave plate at 0 with a variable $-2\alpha$ retarder oriented at $\pi/4$ on one side and a variable $-2\alpha$ retarder oriented at $-\pi/4$ on the other. The bottom line of Eq. 2 demonstrates that the filter of FIG. 5c satisfies the wide-field Lyot filter criteria. It is equivalent to a half-wave plate at 0, parallel to the entrance polarizer, disposed between matched split elements oriented at $\pi/4$ and $-\pi/4$. Each split element in the filter stage is therefore comprised of a passive $\Gamma_o/2$ retarder in combination with an active $-2\alpha$ retarder.

Transmission spectra for the continuously tunable wide-field filter are illustrated in FIG. 7. FIG. 7a is an embodiment of the filter. The spectrum with light at normal incidence and $\alpha=0$ is shown in FIG. 7b. When light is incident at 45°, the peak transmission is shifted by 7 nm from 540 to 547 nm (FIG. 7c). Recall that for the simple continuously tunable Lyot filter of FIG. 6a, incidence at only 15° produces a 7 nm shift. The transmission is continuously tunable with rotation of the liquid crystal optic axis. Rotation to $\alpha=45°$ produces the spectrum of FIG. 7d with a transmission minimum at 543 nm.

Figure 5D:
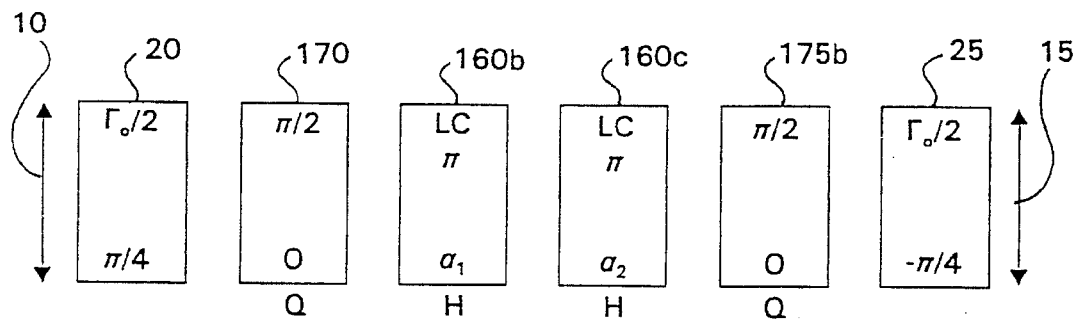
Figure 7A:
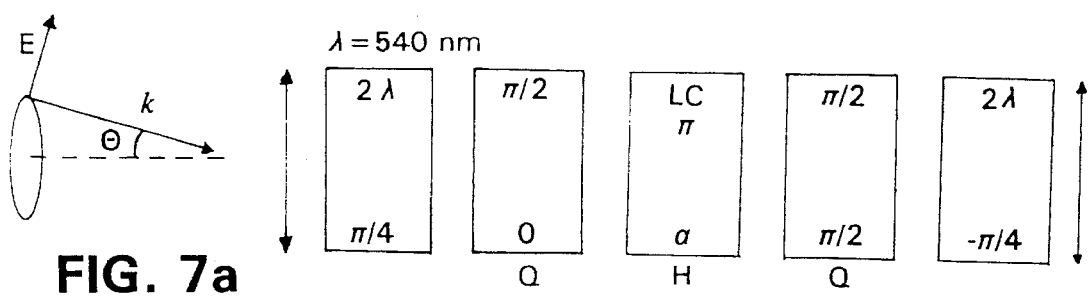
FIGS. 7a–7d, is a continuously-tunable, wide-field liquid crystal Lyot filter (FIG. 7a) and the transmission through the filter as a function of liquid crystal tilt angle, $\alpha$, and angle of incidence, $\Theta$ (FIGS. 7b–7d).
Figure 7B:
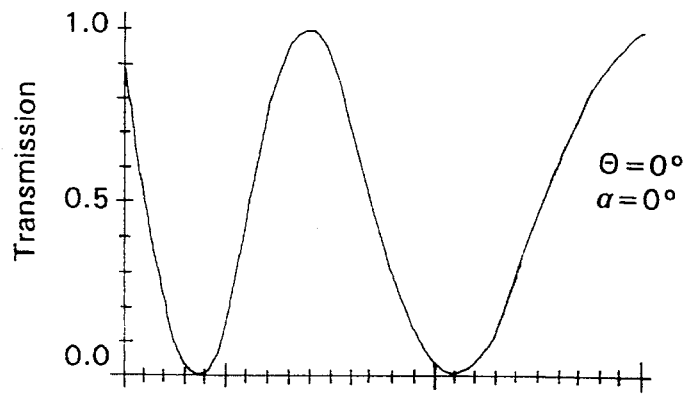
Figure 7C:
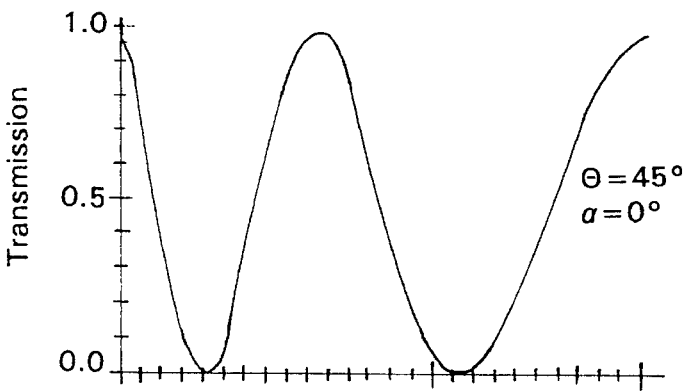
Figure 7D:
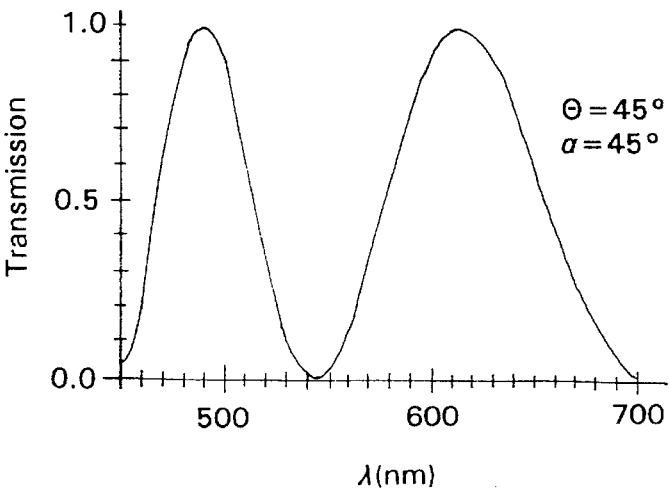

Compound retarders can function as achromatic retarders (see, for example, S. Pancharatnam (1955), Ind. Acad. Sci. Proc. 41, 130, or C. J. Koester (1959), J. Opt. Soc. Am. 49, 303, or A.M. Title (1975), Appl. Opt. 14, 229). Compound active or passive retarders can be used in the filters of this invention. Multiple liquid crystal active elements can also provide an increased tuning range and chromatic compensation. FIG. 5d is a continuously tunable wide-field filter with liquid crystal half-wave retarders 160b and 160c between quarter-wave plates 170 and 175b. When the central retarder is a compound retarder comprising an even number of half-wave retarders, the quarter-wave plates must be parallel in order for the quarter-half-half-quarter sequence to produce a composite retardance equivalent to a half-wave retarder at 0 between tunable retarders at $\pi/4$ and $-\pi/4$. For chromatic compensation it is preferred that the optic axes of sequential analog CSLC cells in series in the stage be perpendicular to each other in the off-state. In a further embodiment a discrete state CSLC cell is used in combination with the analog CSLC cells to allow the filter to be tuned through an entire FSR.

Figure 8A:
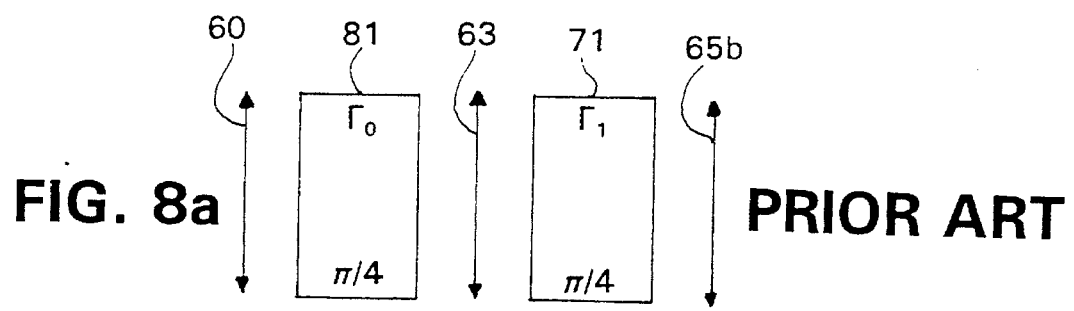
Figure 8B:
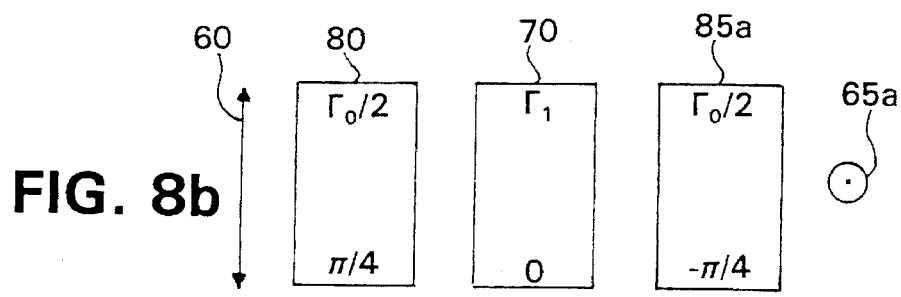

In addition to the wide-field split-element filters, this invention further provides split-element filters which can combine two filter stages into one and can provide notch filters, cut-on and cut-off filters, and high contrast filters. The split-element filters comprise a pair of equal split-element retarders disposed about a center retarder. The wide-field filter is a special case of the split-element filter in which the split elements are crossed and the center retarder has a half-wave retardance. The split-element single-stage filter of FIG. 8b, introduced in passive form by Evans, provides a transmission function similar to a two-stage Lyot filter (FIG. 8a). Outside retarders 80 and 85a have identical retardances, $\Gamma_o/2$, and have optic axes crossed. The optic axes are oriented at $\pm\pi/4$ with respect to the input polarization. Center retarder 70, with retardance $\Gamma_1$, can be oriented either parallel or perpendicular to the input polarization. In the illustrated example it is parallel to the input polarization. Entrance polarizer 60 and analyzing polarizer 65a are crossed. The transmission function for the split-element stage with crossed polarizers is given by $$T_c=\sin^2[\Gamma_o/2]\sin^2[\Gamma_1/2].$$

Eq. 3

This can be compared to a two-stage Lyot filter of FIG. 8a which has $\cos^2$ transmission functions for each stage rather than $\sin^2$ functions. The split-element filter has transmission equivalent to a two-stage geometric-progression Lyot filter when, in Eq. 3, $\Gamma_o/2=\pi(2n+1/2)$ and $\Gamma_1/2=\pi(n+1/2)$, where n is an integer. In other words, to reproduce the spectrum of the two stage Lyot filter, achromatic quarter-wave ($\pi/2$) retardance shifts are added to each split element and an achromatic half-wave ($\pi$) retardance shift is added to the center retarder. The quarter-wave and half-wave shifts make cosine functions from the sine functions. The first and second terms in Eq. 3 give the functions illustrated in FIGS. 9b and 9a, respectively, and the product of the two functions is illustrated in FIG. 9c. The finesse of this filter is 4.

Figure 8C:
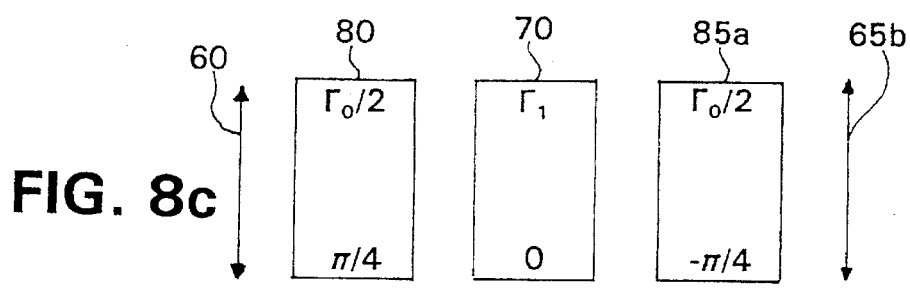

A high throughput notch filter of this invention is illustrated in FIG. 8c. It contains the same elements as the split-element Lyot filter of FIG. 8b but polarizers 60 and 65b are parallel instead of crossed. Conservation of power requires that parallel polarizers yield the inverse spectrum $$T_p=1-\sin^2[\Gamma_o/2]\sin^2[\Gamma_1/2],$$

Eq. 4 as illustrated in FIG. 9d. Because the spectrum is the inverse of Eq. 3, it inverts the finesse to ¼, which is especially useful for color generation. FIG. 10 shows optimum transmission spectra for a three color red-green-blue (RGB) color filter. Note the similarity between FIG. 10b and FIG. 9d. The split-element notch filter of this invention approaches this optimum spectrum by producing broad transmission bands for efficient transmission of the desired wavelengths, with a sharp transition for blocking the unwanted wavelengths. This design eliminates the tradeoff between spectral purity and throughput found previously for Lyot filters.

Figure 8D:
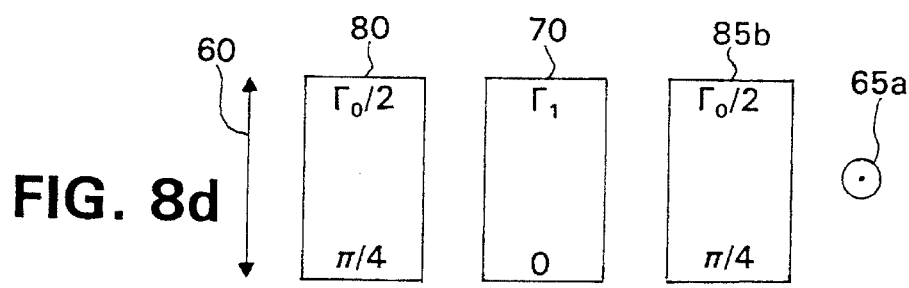
Figure 8E:
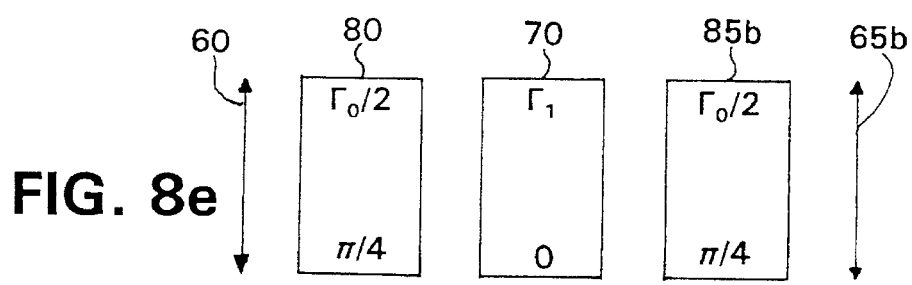

In a further embodiment of the split-element filter of this invention the split elements 80 and 85b have parallel optic axes, as shown in FIGS. 8d and 8e. When the polarizers are crossed (FIG. 8d), the transmission spectrum is a bandpass filter with $$T_c=\sin^2[\Gamma_o/2]\cos^2[\Gamma_1/2],$$

Eq. 5 and when they are parallel (FIG. 8e), the spectrum is a notch filter with $$T_p=1-\sin^2[\Gamma_o/2]\cos^2[\Gamma_1/2].$$

Eq. 6

Since only the first term is a sine function, this configuration requires only an achromatic quarter-wave shift in each split element to produce the spectrum of a two-stage Lyot filter (FIG. 9c) or notch filter (FIG. 9d). The generic split-element filter is illustrated in FIG. 8f. Retarder 85 is parallel or crossed with respect to retarder 80 and polarizer 65 is parallel or crossed with respect to polarizer 60.

A reflection-mode embodiment of the split-element filter employs a mirror in lieu of a second split-element and a second polarizer. The reflection mode device of FIG. 8g, with reflector 62, is equivalent to the filter of FIG. 8e. Two passes through retarder 72 are equivalent to a single pass through retarder 70. Split-element retarder 80 is oriented at $\pi/4$. For light propagating in the reverse direction, the relative orientation is $-\pi/4$, but reflection from the mirror inverts the polarization, thereby providing the equivalent of a $\pi/4$ orientation.

The split element filter of this invention can be tuned by using liquid crystal retarders alone or in combination with passive retarders. Any of retarders 70, 80, and 85 (FIG. 8f) can be nematic or homeotropically aligned smectic liquid crystal variable retarders. High speed discrete switching can also be achieved using SmC* planar aligned liquid crystal cells as shown in FIG. 11. Center retarder unit 70t (FIG. 11a) comprises liquid crystal cell 90 in combination with fixed retarder 70. In the on-state the liquid crystal cell is aligned parallel to the center retarder and adds to its retardance. In the off-state it is orthogonal to the center retarder and subtracts from its retardance. The discretely-tunable split-element filter is illustrated in the generic form in FIG. 11a. The transmission of a given filter species depends on whether split elements 80 and 85 are parallel or crossed and whether polarizers 60 and 65 are parallel or crossed.

The tuning of the center retarder of the split-element filter is illustrated in FIG. 12. FIG. 12a is an embodiment of the tunable split-element filter of FIG. 11a. The split elements are parallel and the polarizers are crossed, so the transmission is described by Eq. 5. To achieve a geometric-progression Lyot transmission function, the split elements have retardances $4\lambda+\lambda/4$ and the net retardance of passive center retarder and the liquid crystal cell in the off-state is $4\lambda$. In this example, the liquid crystal cell is a quarter-wave retarder which is oriented in the off-state at $\pi/2$, orthogonal to the passive center retarder, so that its retardance is subtracted from the fixed retardance to provide a transmission maximum at the design wavelength, $\lambda=540$ nm (FIG. 12b). In the on-state the liquid crystal retardance adds to the fixed retardance and tunes the spectrum by a half-wave (FIG. 12c). Note that the liquid crystal cell can precede or follow the center retarder. In this example, the higher order retarder is split. In the split-element filters of this invention, the thinner retarder can alternatively be split. The split-element filters of the invention are not limited to retardances which, as in this example, produce geometric-progression Lyot type filters.

The split-element filter can also be tuned with tunable split element units 80t and 85ta (FIG. 11b) which comprise liquid crystal cells 100 and 105a positioned between passive split-element retarders 80 and 85. The liquid crystal cells are crossed in the off-state so they do not modify the retardance of central retarder 70. In the on-state the optic axis of each liquid crystal cell is parallel to the adjacent split-element retarder and adds to its retardance. For the case when the liquid crystal cells are quarter-wave retarders, the spectrum is shifted by a half-wave.

Figure 11A:
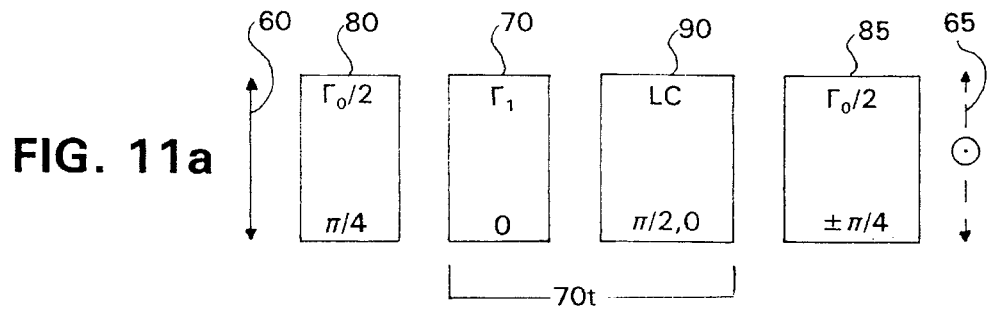
FIGS. 11a–11d, illustrates discretely-tunable liquid crystal split-element filters with a tunable center retarder (FIG. 11a), and with tunable split elements using liquid crystal cells inside the split elements (FIGS. 11b and 11c) and outside of the split elements (FIG. 11d).
Figure 11B:
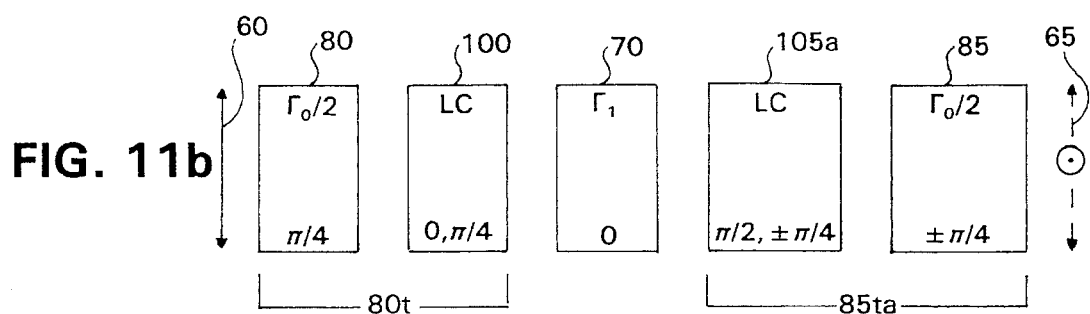
Figure 11C:
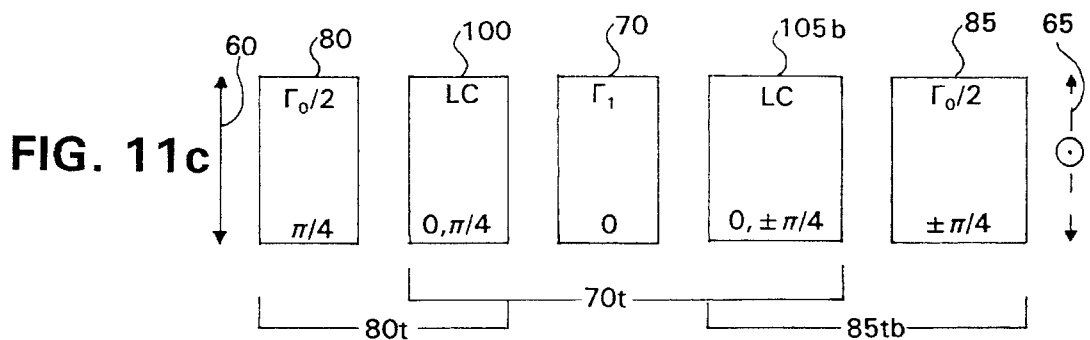

Both the center retarder and the split elements are tuned in the embodiment of FIG. 11c. Liquid crystal cells 100 and 105b are parallel in the off-state; consequently, they add to center retarder 70 to make a tunable center retarder 70t. In the on-state, they add instead to split-element retarders 80 and 85 to form tunable split-element units 80t and 85tb.

Figure 11D:
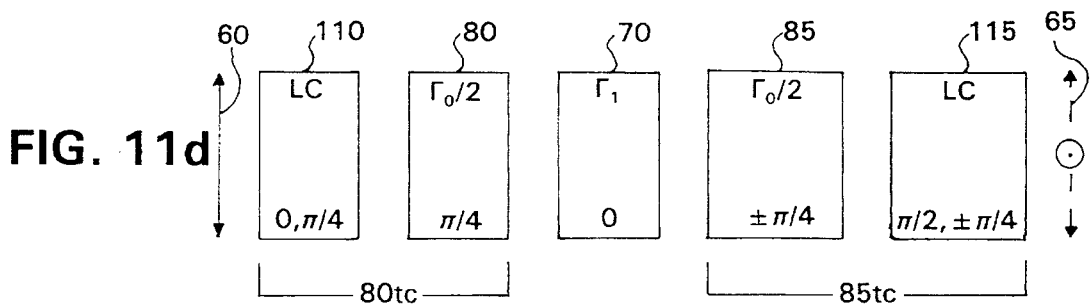

Liquid crystal cells 110 and 115 can also be positioned outside the passive split-element retarders as shown in FIG. 11d. In the off-state they are either parallel or perpendicular to adjacent polarizers 60 and 65 so they have no effect on the filter transmission function. In the on-state they are parallel to adjacent split elements 80 and 85 so that they add to the retardance to make tunable split-element units 80tc and 85tc.

The tuning elements of the different embodiments illustrated in FIG. 11 can be combined to give tuning of both the center retarder and the split elements. The center retarder or the split elements can have wide-field structures. The split-element filter of this invention further includes reflection mode designs.

Multiple stages of the split-element filters of this invention can be connected in series. FIG. 13 illustrates a four-stage Lyot filter and a tunable two-stage split-element version. The four-stage filter of FIG. 13a contains three stages with retarders 271, 281 and 381 in the standard geometric series (n, 2n, 4n, ... ) and one contrast element stage with retarder 371. Contrast element 371 has the same retardance as the second thickest retarder 281 and functions to reduce the prominent side lobes present in normal Lyot filters. This filter requires five polarizers, 60, 66, 65b, 67 and 68.

The split-element version (FIG. 13b) requires only three polarizers, 60, 65a and 68. Element 281 is split in half to become elements 280 and 285. A quarter-wave retardance is added to each to provide a Lyot type transmission. The split elements are parallel and polarizers 60 and 65a are crossed, so the transmission of this stage is described by Eq. 5. Thus, when retarder 271 of the four-stage filter becomes the central retarder of the split-element filter, the retardance must be $9\lambda$ to provide a $+^{\sim\sim\sim}U^*$ transmission. This is provided in tunable center retarder unit 270t by fixed $9.25\lambda$ retarder 270 in combination with liquid crystal $0.25\lambda$ retarder 290, which is aligned to subtract from the fixed retarder in the off-state and to add to it in the on-state. In the second stage of the split-element filter, center retarder 370 replaces retarder 371 of the four-stage Lyot and split elements 380 and 385 replace retarder 381.

In this embodiment of the split-element filter, only the lowest order retarder contains a liquid crystal tuning element. This succeeds when the center wavelength of the on-state is switched by half of the free spectral range (FSR) from the off-state peak, because all but the lowest order stage produce peaks in transmission at FSR/2 in the absence of tuning.

Figure 14A:
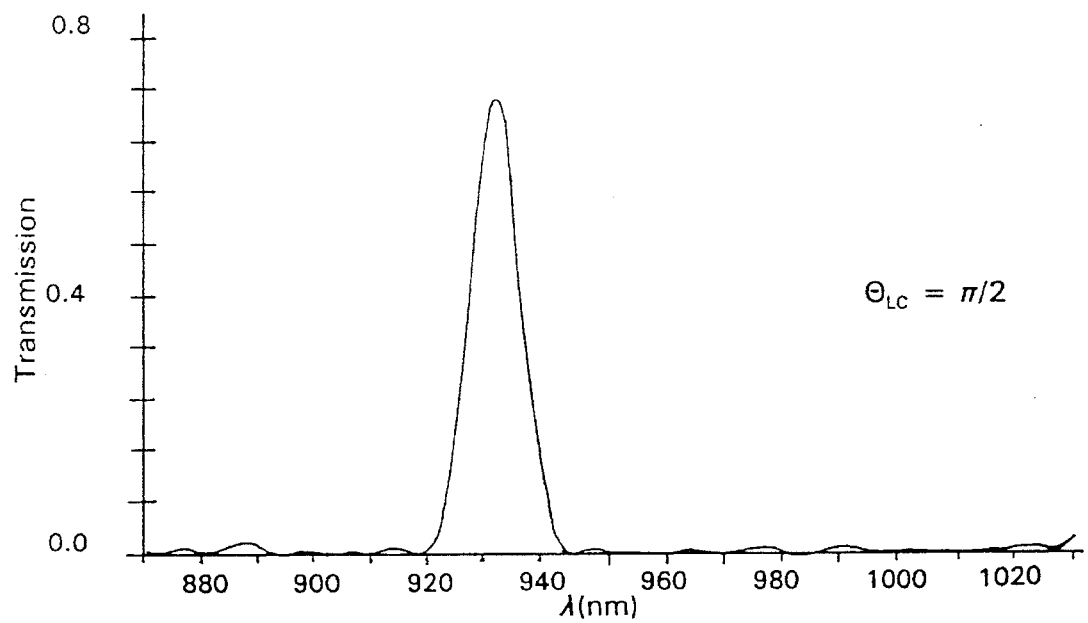
FIGS. 14a–14b, illustrates the transmission spectra of the filter of FIG. 13b in the off-state (FIG. 14a) and in the on-state (FIG. 14b).
Figure 14B:
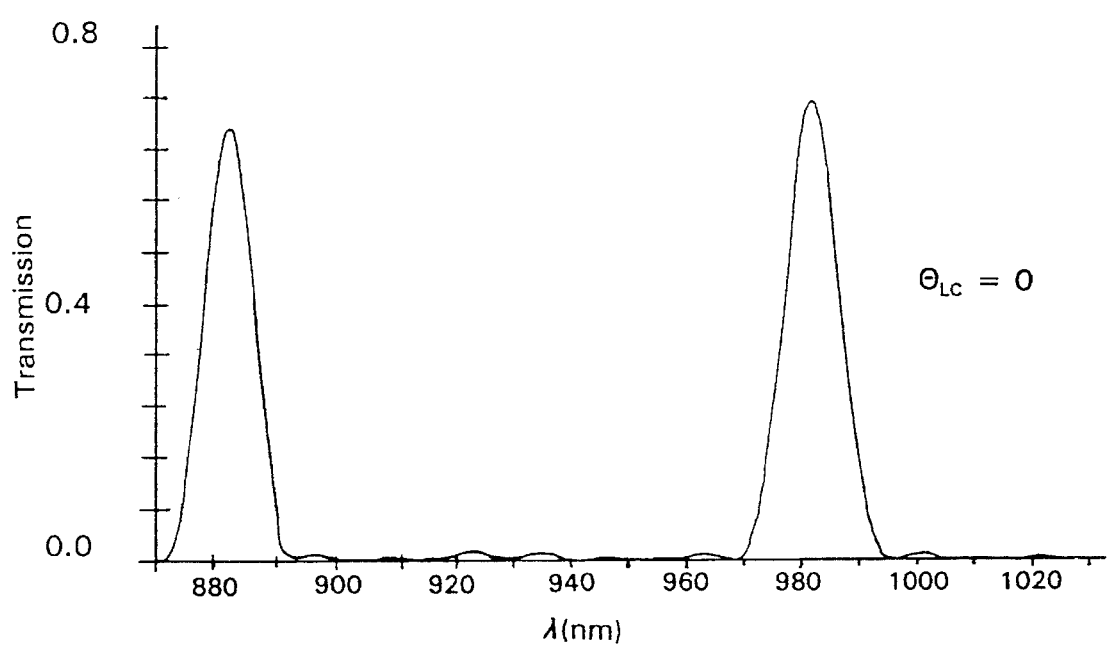

The tuning of the two-stage split-element filter of FIG. 13b is illustrated in FIG. 14. In the off-state (FIG. 14a), there is a transmission peak at the design wavelength, $\lambda=930$ nm. In the on-state (FIG. 14b), that peak is switched to 980 nm. This filter is optimized for the differential absorption of the water vapor band at 930 nm.

Figure 15A:
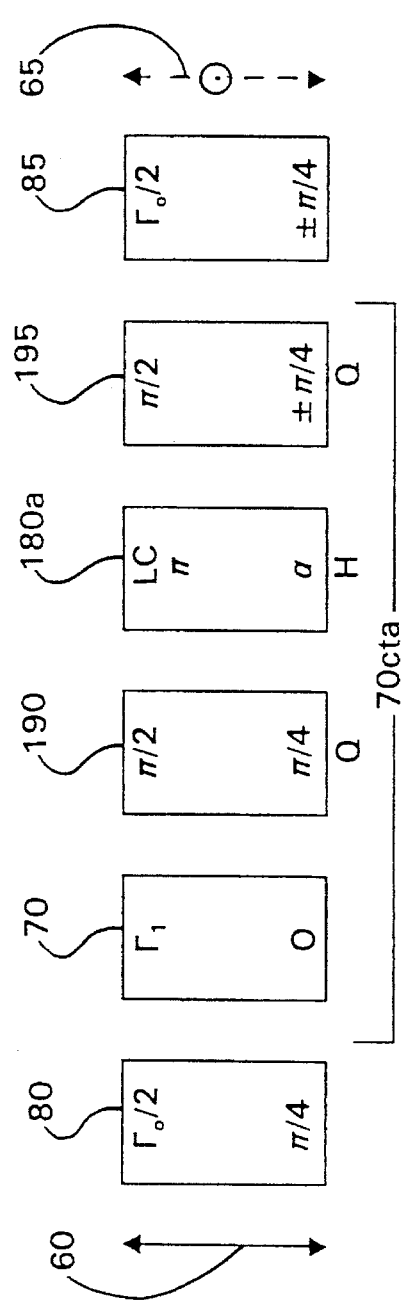

The split-element filters of this invention can also be continuously tuned, for example, with SmA* liquid crystal cells. FIG. 15a illustrates continuously tunable retarder unit 70cta which comprises center retarder 70 in combination with rotatable half-wave liquid crystal cell 180a and quarter-wave retarders 190 and 195. As in the split-element filters of FIG. 8, split element 85 can be parallel or crossed with split element 80, and polarizer 65 can be parallel or crossed with polarizer 60. Quarter-wave plate 195 can be parallel or crossed with quarter-wave plate 190. For the embodiment where they are parallel, the quarter-half-quarter sequence 190, 180a, 195 is equivalent to a variable retarder with retardance $4\alpha$ oriented at 0 and it modifies the retardance of center retarder 70. For the embodiment where the quarter-wave plates are crossed, the quarter-half-quarter sequence is equivalent to a variable retarder at 0 in combination with a half-wave plate at π/4. The effect of the half-wave plate at π/4 is to switch the effective orientation of split-element retarder 85 from π/4 to −π/4 or from −π/4 to π/4, and to similarly switch the effective orientation of polarizer 65 by π/2. Thus the filter with quarter-wave retarders crossed, split elements parallel and polarizers parallel is equivalent to the filter with quarter-wave retarders parallel, split elements crossed and polarizers crossed.

Figure 15B:
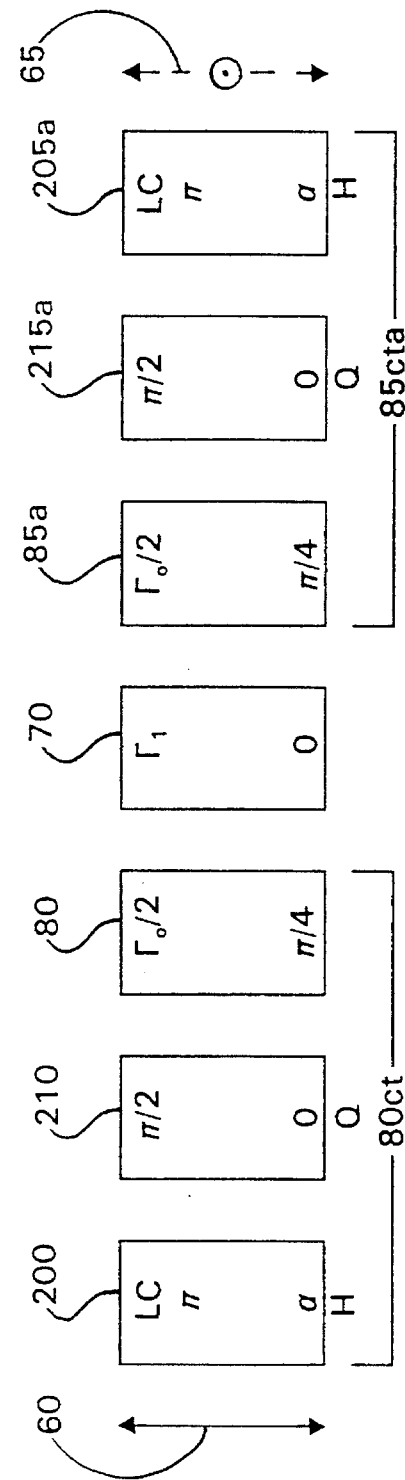

The split-element retarders of the filters can also be continuously tuned, as illustrated in FIGS. 15b and 15c. Continuously tunable split element unit 80ct comprises passive split element 80, tuned by rotatable liquid crystal half-wave retarder 200 in combination with quarter-wave plate 210. For parallel split elements (FIG. 15b), tunable split element unit 85cta comprises passive split element 85a, tuned by rotatable liquid crystal half-wave retarder 205a in combination with quarter-wave plate 215a. For crossed split elements (FIG. 15c), split element unit 85ctb is tuned with rotatable liquid crystal half-wave retarder 205b in combination with quarter-wave plate 215b. To make the crossed split-element embodiment, the second passive split element and the accompanying tuning elements are all rotated by π/2 compared to the parallel split-element embodiment.

Figure 16A:
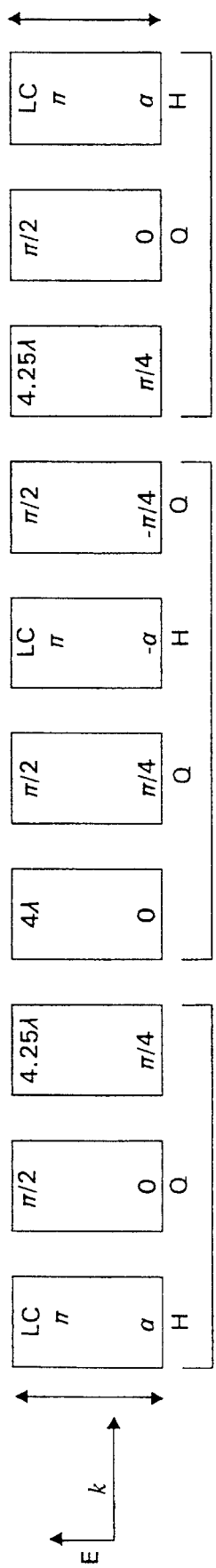
FIGS. 16a–16d, is a continuously-tunable liquid crystal split-element filter with a tunable center retarder and tunable split elements (FIG. 16a) and the transmission through the filter as a function of liquid crystal tilt angle, α, (FIGS. 16b–16d).
Figure 16B:
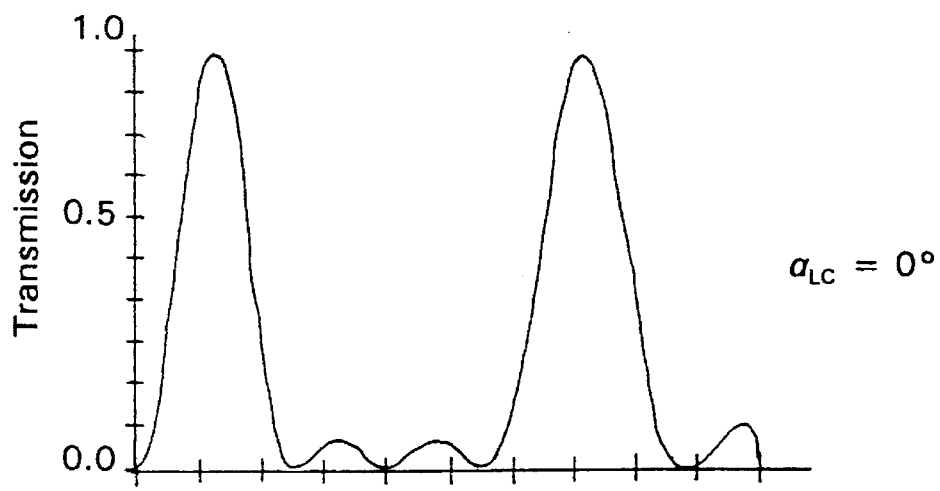
Figure 16C:
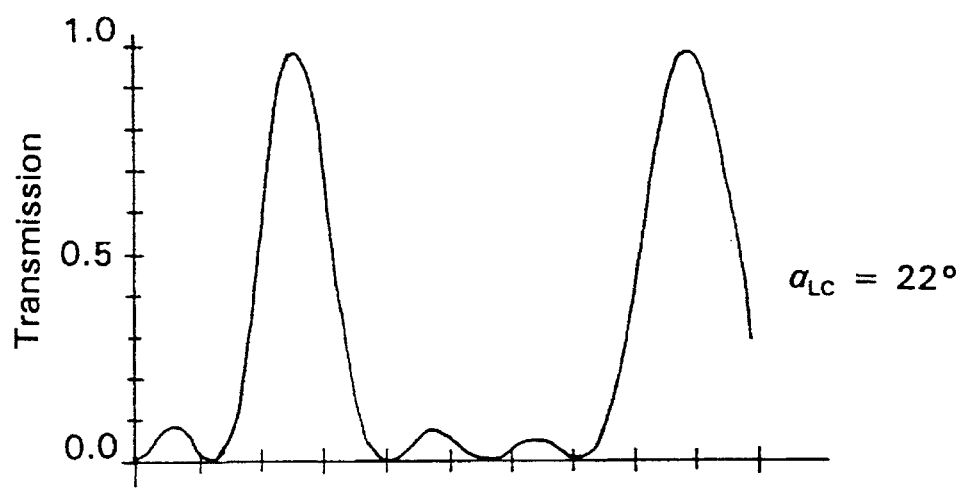
Figure 16D:
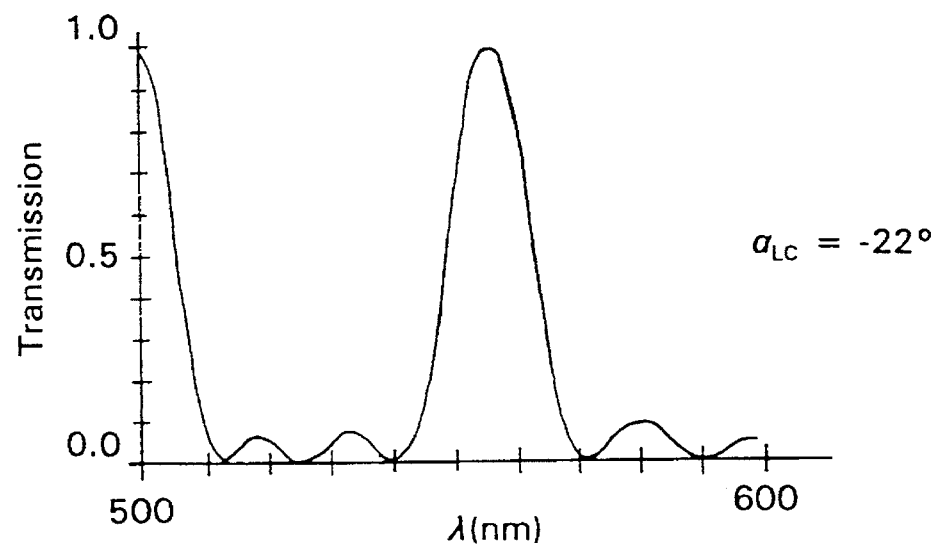

Both the center retarder and the split-element retarders can be simultaneously tuned, as illustrated in FIG. 15d. In this embodiment, the tuning of the center illustrated in FIG. 15a and the tuning of the split elements illustrated in FIG. 15b are combined. The tuned split elements of FIG. 15c can alternatively be employed. A specific embodiment of the simultaneously tuned split-element filter is shown in FIG. 16a. The transmission spectrum can be continuously tuned with rotation of α in each of the three liquid crystal cells. Transmission with α=0, 22, and −22° is illustrated in FIGS. 16b–16d. In the off-state (α=0), the filter has a transmission minimum at 540 nm. Rotation of the liquid crystals by 22° tunes the filter minimum by one quarter of the free spectral range to 556 nm. Rotation by −22° tunes the minimum to 526 nm.

Figure 17A:
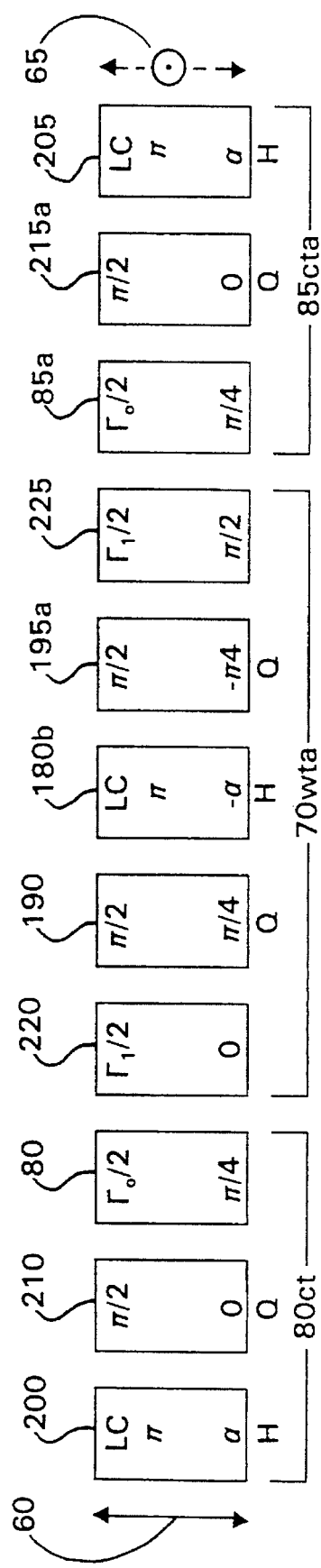
FIGS. 17a–17b, illustrates continuously-tunable, wide-field split-element filters with both tunable center and split-elements (FIG. 17a) and with a tunable compound center retarder (FIG. 17b).

The split-element filters of this invention can be constructed in wide-field embodiments. The tunable center retarder unit 70ctb of FIG. 15d is shown in the wide-field tunable configuration 70wta in FIG. 17a. Retarder 70 is split into crossed retarders 220 and 225. Disposed between them is a quarter-half-quarter variable retarder comprising 190, 180b and 195a. Quarter-wave plates 190 and 195a are crossed so the quarter-half-quarter sequence is equivalent to a half-wave plate at π/4 and disposed between a pair of variable retarders, each having retardance 2α, and with one oriented at 0 and the other at π/2. Thus, the elements of 70wta fill the criteria of a tunable wide-field filter: a central half-wave plate between crossed and matched variable retarders.

Figure 17B:
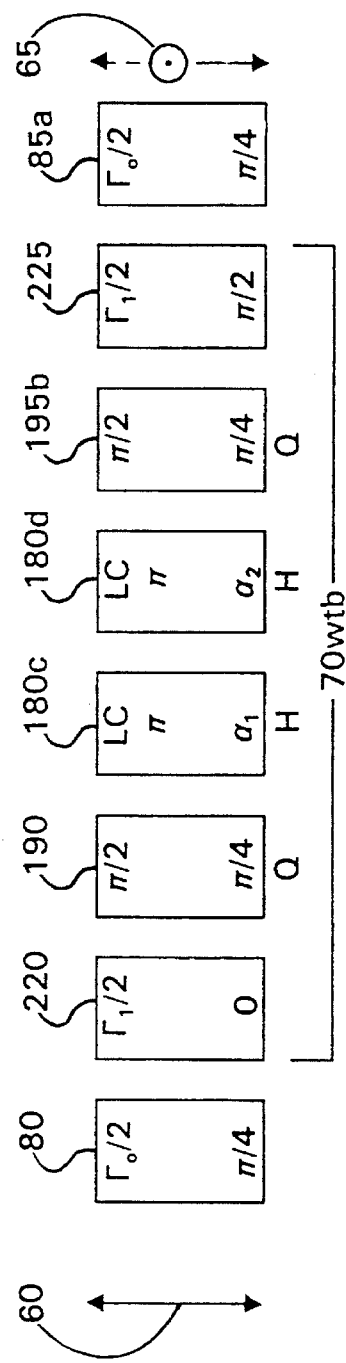
Figure 18A:
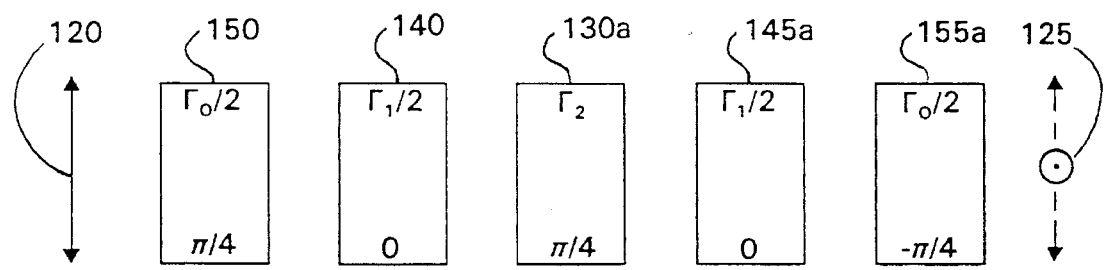
FIGS. 18a–18d, is a double split-element filter with outside split-elements crossed, inside split-elements parallel (FIG. 18a), with crossed inside and outside split-elements (FIG. 18b), with parallel inside and outside split-elements (FIG. 18c) and in the generic form (FIG. 18d).
Figure 18B:
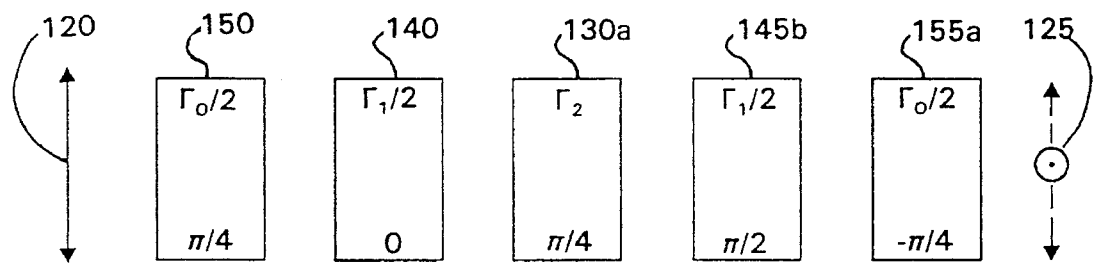
Figure 18C:
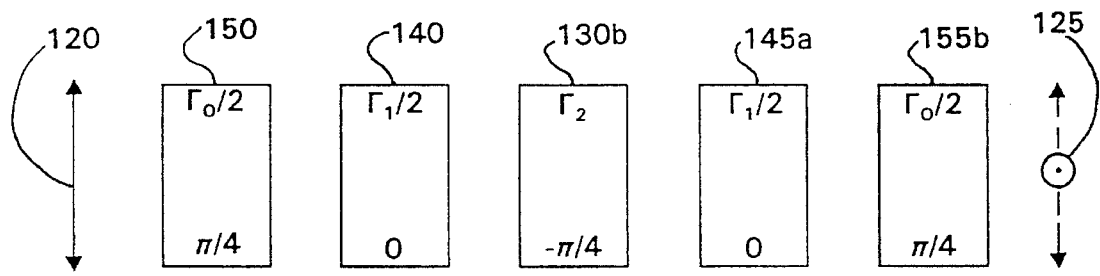
Figure 18D:
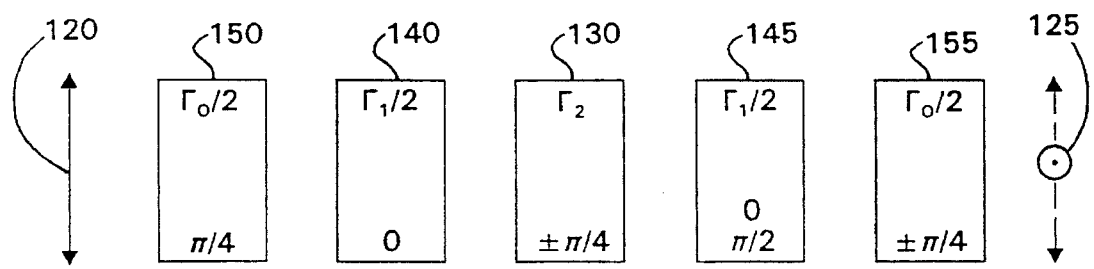

A split-element filter with a wide-field continuously-tunable center retarder and passive split elements is illustrated in FIG. 17b. In the illustrated embodiment, tuning of wide-field center retarder unit 70wtb is provided by a quarter-half-quarter variable retarder which contains a compound half-wave retarder comprising liquid crystal cells 180c and 180d. Because there are two half-wave retarder plates, quarter-wave plates 190 and 195b are parallel instead of crossed, as taught in FIG. 5d.

The filter elements can be further split to form the double split-element filter of this invention, as shown in FIG. 18. In the generic form (FIG. 18d), the filter consists of parallel or crossed polarizers 120 and 125, center retarder 130, inside split-elements 140 and 145, and outside split-elements 150 and 155. The double split-element filter cannot produce the spectrum of a three-stage geometric-progression Lyot filter. However, double split elements can produce other filter functions which are quite useful. For example, when the outside split elements have crossed optic axes and the inside split elements have parallel optic axes (FIG. 18a), the spectra produced by the double split-element filter are $$T_c = 1 - \cos^2[\Gamma_2/2](1 - \sin^2[\Gamma_o/2]\sin^2[\Gamma_1/2]), \quad \text{Eq. 7}$$

for crossed polarizers, and for parallel polarizers $$T_p = \cos^2[\Gamma_2/2](1 - \sin^2[\Gamma_o/2]\sin^2[\Gamma_1/2]). \quad \text{Eq. 8}$$

The transmission functions produced with crossed outside split elements and crossed inside split elements (FIG. 18b) are $$T_c = \sin^2[\Gamma_2/2](1 - \sin^2[\Gamma_o/2]\sin^2[\Gamma_1/2]), \quad \text{Eq. 9}$$

and, $$T_p = 1 - \sin^2[\Gamma_2/2](1 - \sin^2[\Gamma_o/2]\sin^2[\Gamma_1/2]), \quad \text{Eq. 10}$$

The transmission functions produced with parallel outside split elements and parallel inside split elements (FIG. 18c) are $$T_c = (\sin[\Gamma_2/2]\cos[\Gamma_o/2] - \sin[\Gamma_o/2]\cos[\Gamma_2/2]\cos[\Gamma_1/2]) \quad \text{Eq. 11}$$

and, $$T_p = 1 - (\sin[\Gamma_2/2]\cos[\Gamma_o/2] - \sin[\Gamma_o/2]\cos[\Gamma_2/2]\cos[\Gamma_1/2]) \quad \text{Eq. 12}$$

Transmission functions for the other orientations of the components of the double split-element filter can be similarly derived.

Figure 19A:
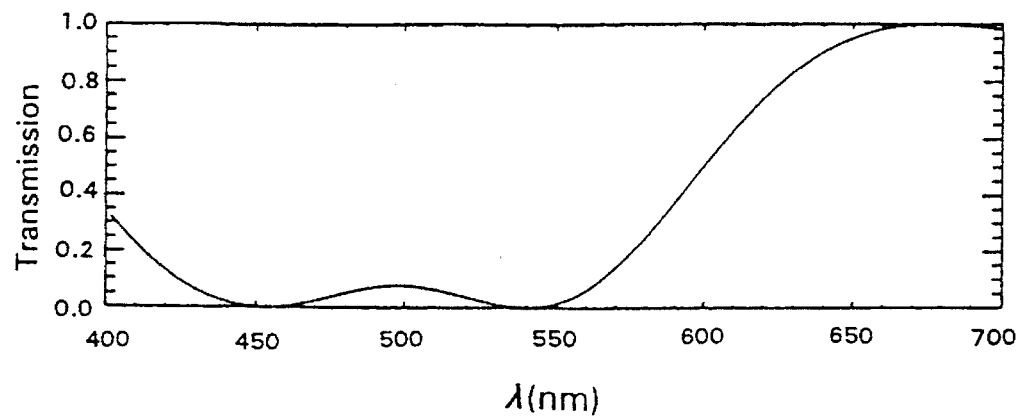
FIGS. 19a–19c, illustrates red (FIG. 19a), green (FIG. 19b), and blue (FIG. 19c) transmission spectra produced by passive double split-element filters.
Figure 19B:
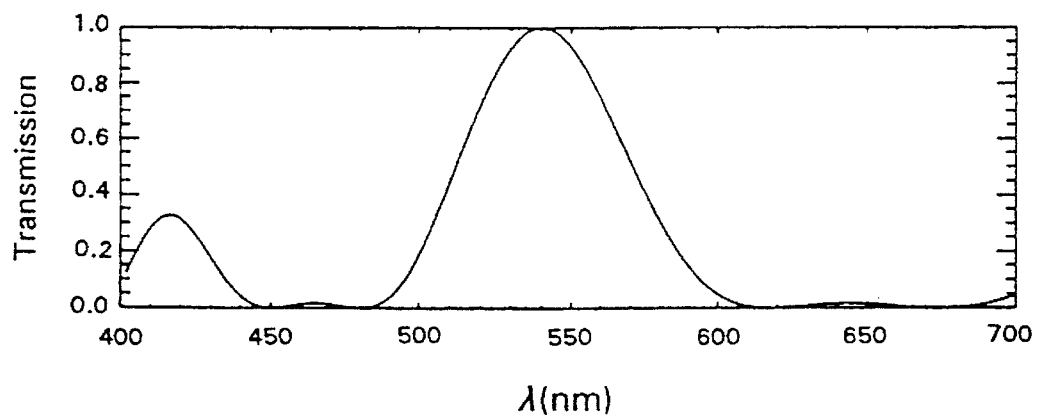
Figure 19C:
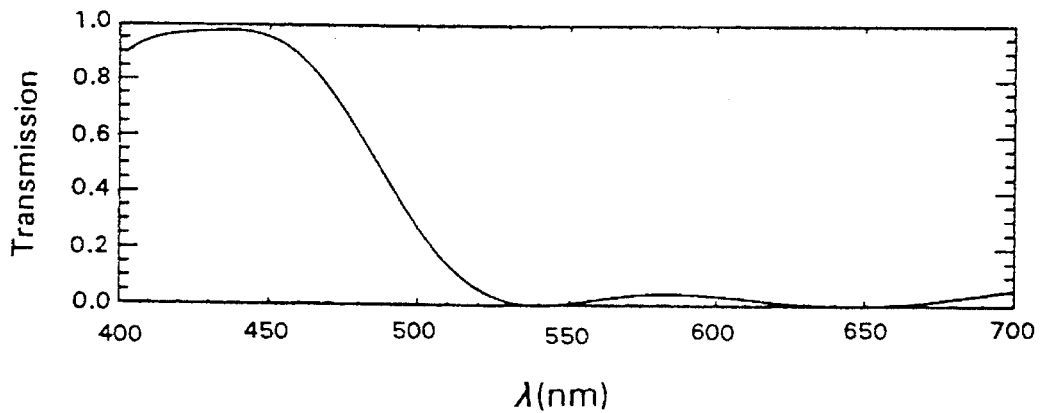

The above equations can be used to design split-element filters that are appropriate for color generation. Looking, for example, at Eq. 8, the transmission is $\cos^2[\Gamma_2/2]$ times the notch split-element transmission of Eq. 4. Thus the inside and outside split elements create a notch filter. The center retarder can then be used to isolate one of the transmission bands using a low-order retarder. For example, the green band can be rejected using the notch spectrum such that broad transmission bands exist in the red and blue. The outside split elements can then switch between red and blue transmission spectra. Examples of red, green, and blue high throughput filters which can be produced with passive double split-element filters are shown in FIGS. 19a–c.

The double split-element filter of this invention can be tuned with liquid crystal cells. As taught for the case of the single split-element filter, the center retarder and/or the split elements can be discretely or continuously tuned. In addition, planar aligned smectic liquid crystal cells, used for the outside split-element retarders, can be oriented so that in one switching position they are parallel or perpendicular to the adjacent polarizers and thus do not modify the transmission spectrum. In this state the filter has the transmission of a single split-element filter. The filter can thus be switched between a single and double split-element filter. Similarly, the single split-element filter described previously can be switched between a simple Lyot filter and a split-element Lyot filter.

Figure 20C:
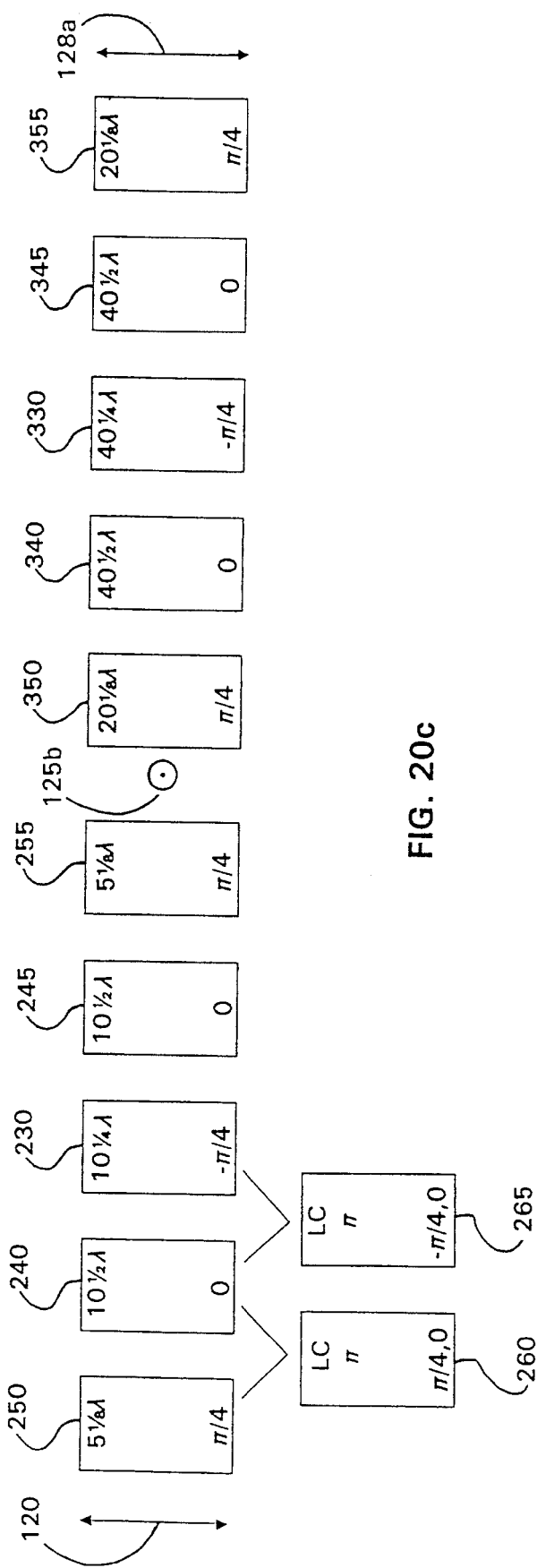

Two or more stages of the double split-element filter can be combined in series. FIG. 20 illustrates a six-stage Lyot filter (FIG. 20a), a split-element three-stage version (FIG. 20b), and a two-stage double split-element version (FIG. 20c). The double split-element stages of FIG. 20c are described by Eq. 11. The six-stage Lyot filter comprises seven polarizers (120, 121, 122, 125a, 126, 127 and 128a) and six retarders (251, 231, 241, 351, 331 and 341). Two of the stages contain contrast elements. The equivalent split-element version contains four polarizers (120, 123, 126 and 128b) and nine retarders (243, 232, 245, 353, 252, 355, 343, 332 and 345). The double split-element version requires only three polarizers (120, 125b and 128a) and ten retarders (250, 240, 230, 245, 255, 350, 340, 330, 345 and 355). The correspondence between the stages of these three filters is clear in light of the previous examples. As a guide, the first two digits of the reference numerals are the same for corresponding retarders. Note that the total number of elements (polarizers plus retarders) is 13 in all three cases. However, the split-element and double split-element filters require fewer polarizers and thus reduce a primary source of throughput loss.

Figure 21A:
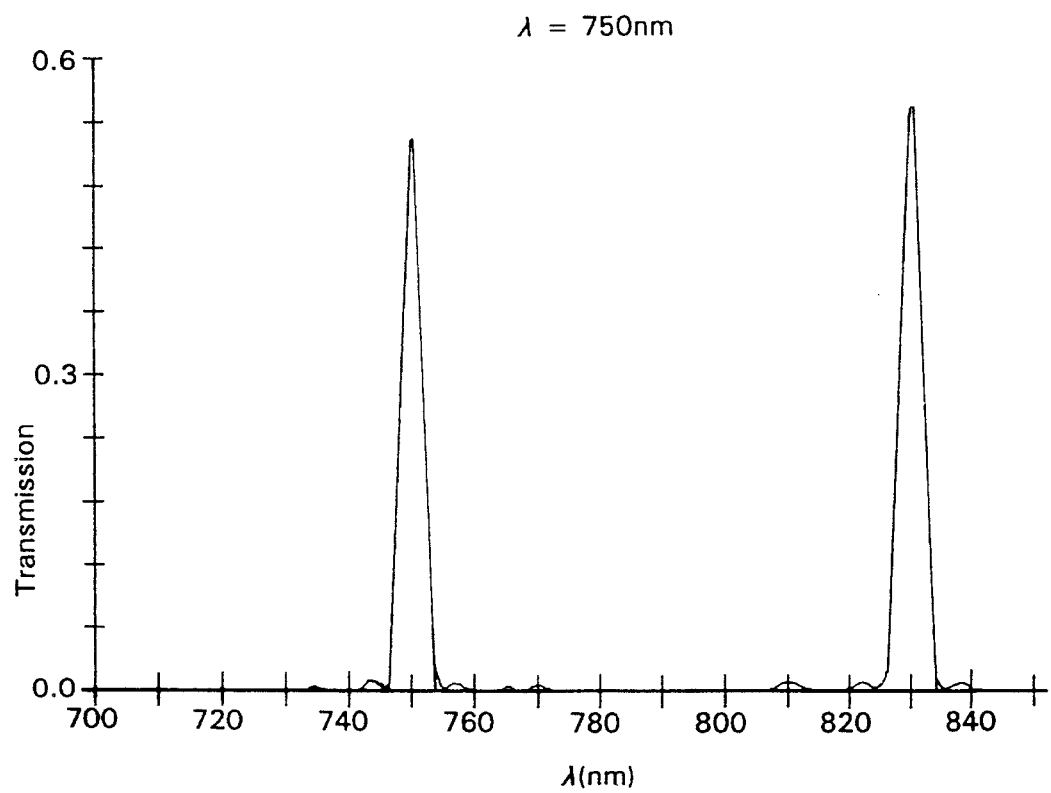
FIGS. 21a–21b, is the transmission spectra of the two-stage double split-element liquid crystal filter of FIG. 20c in the off-state (FIG. 21a) and in the on-state (FIG. 21b).
Figure 21B:
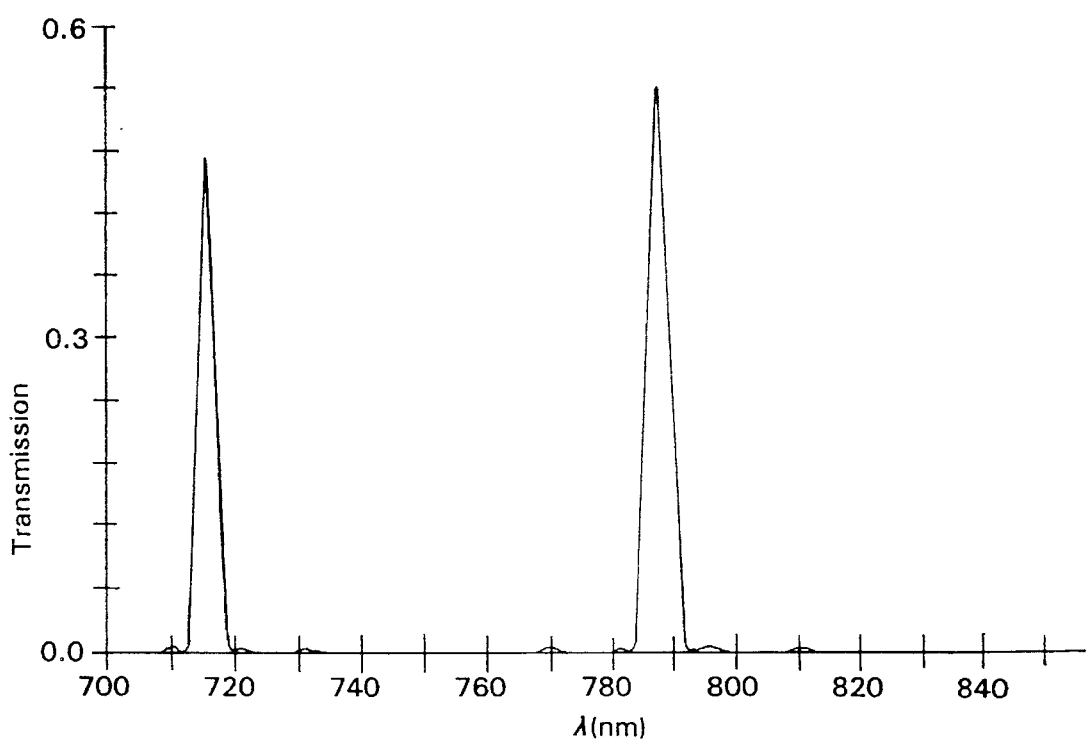

The two-stage double split-element filter of FIG. 20c can be tuned by liquid crystal half-wave retarders 260 and 265 which modify passive retarders 240 and 245. In the off-state, the liquid crystal retarders are crossed and have no net effect. In the on-state they are oriented parallel to split elements 240 and 245 and thus the liquid crystal and passive retardances add together. For a design wavelength $\lambda=750$ nm, the transmission spectra produced by the two-stage tunable double split-element filter of FIG. 20c are illustrated in FIG. 21. The contrast between the transmission at 750 nm in the off-state (FIG. 21a) and the on-state (FIG. 21b) is on the order of 100,000:1.

The above examples are illustrations of this invention but do not limit the embodiments which come within the spirit and scope of this invention. The filters can contain liquid crystal variable retarders, such as nematic or homeotropically aligned smectic liquid crystals, or they can contain smectic liquid crystal cells with fixed retardance and optoelectronically rotatable orientation. The retarders can be compound retarders. The double split-element filters can be passive or tunable.

The polarizers in the devices of this invention can be any means for polarization, such as linear polarizers, polarizing filters, partial polarizers or polarizing beam splitters. For linearly polarized input light, the input polarizer can be omitted. In lieu of linear polarizers, as illustrated, the devices can be adapted to circular polarizers such as cholesteric liquid crystal polarizers. Circular polarizers replace a linear polarizer and a quarter-wave plate oriented at $\pm\pi/4$ to the polarizer.

The illustrated embodiments can be combined with each other and with other filters known in the art. The wide-field and split-element filters can be cascaded into multiple-stage filters. Any element in the split-element filters can be made in a wide-field version. The filters can contain both discretely and continuously tunable liquid crystal cells. The wide-field liquid crystal tuning taught in this invention can also be applied to other filters. The filters can be constructed in reflection mode embodiments.

In the split-element filters, tuning can be included in the center and/or split retarder. Either the center or split retarders can be of higher order. The split-element filters may be Lyot-type with a geometric progression of retardances, or they can have other relative retardances. These and other embodiments will be readily apparent to those skilled in the art.

The filters of this invention can be used in numerous applications including, but not limited to, differential absorption detectors, wavelength division multiplex optical fiber communications, multi-spectral imaging, fluorescence detectors and color generation. They can be employed in multiple-pixel arrays and can be optically addressed.

We claim:

1. A liquid crystal split-element optical filter comprising one or more stages optically coupled in series wherein at least one stage comprises:

a first polarizer;

a second polarizer oriented parallel or perpendicular to said first polarizer;

a center retarder unit positioned between said first and second polarizers, and comprising one or more retarders and having a composite retardance oriented parallel or perpendicular to said first polarizer;

a first split-element retarder unit, positioned between said first polarizer and said center retarder unit, and comprising a first split-element retarder, oriented at $\pm\pi/4$ with respect to said first polarizer; and a second split-element retarder unit, positioned between said center retarder unit and said second polarizer, and comprising a second split-element retarder of equal retardance to said first split-element retarder and oriented at $\pm\pi/4$ with respect to said first polarizer;

wherein at least one of said retarder units comprises a first liquid crystal retarder, said first liquid crystal retarder having a fixed retardance and having an optic axis rotatable between a first orientation and a second orientation.

2. The split-element filter of claim 1 wherein said center retarder unit has a composite retardance of a half-wave oriented parallel to said first polarizer, and wherein said first split-element retarder is oriented perpendicular to said second split-element retarder.

3. The split-element filter of claim 2 wherein said center retarder unit is approximately achromatic.

4. The split-element filter of claim 2 wherein said center retarder unit comprises a fixed half-wave retarder oriented parallel to said first polarizer.

5. The split-element filter of claim 2 wherein said first split-element retarder is a first fixed split-element retarder and wherein said first split-element retarder unit further comprises said first liquid crystal retarder, positioned between said first fixed split-element retarder and said first polarizer, said first liquid crystal retarder having said first orientation parallel to said first polarizer and said second orientation parallel to said first fixed split-element retarder.

6. The split-element filter of claim 5 wherein said first liquid crystal retarder is a SmC* liquid crystal retarder.

7. The split-element filter of claim 5 wherein said first liquid crystal retarder is a half-wave retarder.

8. The split-element filter of claim 5 wherein said second split-element retarder is a second fixed split-element retarder and wherein said second split-element retarder unit further comprises a second liquid crystal retarder, positioned between said second fixed split-element retarder and said second polarizer, said second liquid crystal retarder having a fixed retardance and having an optic axis rotatable between a first orientation parallel to said second polarizer and a second orientation parallel to said second fixed split-element retarder.

9. The split-element filter of claim 8 wherein said first and second liquid crystal retarders are SmC* liquid crystal retarders.

10. The split-element filter of claim 8 wherein said first and second liquid crystal retarders are quarter-wave retarders.

11. The split-element filter of claim 2 wherein said first split-element retarder is a first fixed split-element retarder and wherein said first split-element retarder unit further comprises said first liquid crystal retarder, positioned between said first fixed split-element retarder and said center retarder unit, said first liquid crystal retarder having said first orientation parallel to said first polarizer and said second orientation parallel to said first fixed split-element retarder, and wherein said second split-element retarder is a second fixed split-element retarder and wherein said second split-element retarder unit further comprises a second liquid crystal retarder, positioned between said second fixed split-element retarder and said center retarder unit, said second liquid crystal retarder having a fixed retardance and having an optic axis rotatable between a first orientation perpendicular to said first polarizer and a second orientation parallel to said second fixed split-element retarder.

12. The split-element filter of claim 11 wherein said first and second liquid crystal retarders are quarter-wave retarders.

13. The split-element filter of claim 11 wherein said first split-element retarder unit further comprises a third liquid crystal retarder, positioned between said first fixed split-element retarder and said first polarizer, said third liquid crystal retarder having a fixed retardance and having an optic axis rotatable between a first orientation parallel to said first polarizer and a second orientation parallel to said first fixed split-element retarder, and wherein said second split-element retarder unit further comprises a fourth liquid crystal retarder, positioned between said second fixed split-element retarder and said second polarizer, said fourth liquid crystal retarder having a fixed retardance and having an optic axis rotatable between a first orientation parallel to said second polarizer and a second orientation parallel to said second fixed split-element retarder.

14. The split-element filter of claim 2 wherein said first split-element retarder is a first fixed split-element retarder and wherein said first split-element retarder unit further comprises a passive quarter-wave retarder, positioned between said first polarizer and said first fixed split-element retarder, with optic axis oriented parallel or perpendicular to said first polarizer, and said first liquid crystal retarder positioned between said first polarizer and said passive quarter-wave retarder, said first liquid crystal retarder having a half-wave retardance and having said optic axis continuously rotatable between said first and second orientations.

15. The split-element filter of claim 14 wherein said first liquid crystal retarder is a SmA* liquid crystal retarder.

16. The split-element filter of claim 2 comprising a quarter-half-quarter compound retarder positioned between said first and second split-element retarders, said quarter-half-quarter compound retarder comprising a first passive quarter-wave retarder oriented parallel or perpendicular to said first polarizer, a second passive quarter-wave retarder oriented parallel or perpendicular to said first polarizer, and said first liquid crystal retarder positioned between said first and second passive quarter-wave retarders, said first liquid crystal retarder having a half-wave retardance and having said optic axis continuously rotatable between said first and second orientations.

17. The split-element filter of claim 16 wherein the composite retardance of said quarter-half-quarter compound retarder is equal to the composite retardance of the combination of a first variable retarder oriented at $\pm\pi/4$ with respect to said first polarizer, a second variable retarder, of equal retardance to said first variable retarder, oriented at $\pm\pi/4$ with respect to said first polarizer, and a fixed half-wave retarder, positioned between said first and second variable retarders, and oriented parallel to said first polarizer.

18. The split-element filter of claim 16 wherein said second passive quarter-wave retarder is oriented perpendicular to said first passive quarter-wave retarder.

19. The split-element filter of claim 18 wherein said first liquid crystal retarder is a SmA* liquid crystal retarder.

20. The split-element filter of claim 16 wherein said quarter-half-quarter compound retarder further comprises a second liquid crystal retarder, positioned between said first and second passive quarter-wave retarders, said second liquid crystal retarder having a half-wave retardance and having a rotatable optic axis, and wherein said second passive quarter-wave retarder is oriented parallel to said first passive quarter-wave retarder.

21. The split-element filter of claim 20 wherein said first liquid crystal retarder is a SmA* liquid crystal retarder.

22. The split-element filter of claim 21 wherein said second liquid crystal retarder is a SmA* liquid crystal retarder.

23. The split-element filter of claim 1 wherein said center retarder unit comprises a fixed center retarder oriented parallel or perpendicular to said first polarizer, and said first liquid crystal retarder, said first liquid crystal retarder having said first orientation perpendicular to said fixed center retarder and said second orientation parallel to said fixed center retarder.

24. The split-element filter of claim 23 wherein said first liquid crystal retarder is a SmC* liquid crystal retarder.

25. The split-element filter of claim 23 wherein said first liquid crystal retarder is a quarter-wave retarder.

26. The split-element filter of claim 1 wherein said center retarder unit comprises a fixed center retarder oriented parallel or perpendicular to said first polarizer, and wherein said first split-element retarder is a first fixed split-element retarder and wherein said first split-element retarder unit further comprises said first liquid crystal retarder, positioned between said first fixed split-element retarder and said fixed center retarder, said first liquid crystal retarder having said first orientation parallel to said center retarder and said second orientation parallel to said first fixed split-element retarder, and wherein said second split-element retarder is a second fixed split-element retarder and wherein said second split-element retarder unit further comprises a second liquid crystal retarder, positioned between said second fixed split-element retarder and said center retarder, said second liquid crystal retarder having a fixed retardance and having an optic axis rotatable between a first orientation parallel or perpendicular to said center retarder and a second orientation parallel to said second fixed split-element retarder.

27. The split-element filter of claim 26 wherein said first and second liquid crystal retarders are SmC* liquid crystal retarders.

28. The split-element filter of claim 1 wherein said center retarder unit comprises a fixed center retarder oriented parallel or perpendicular to said first polarizer, and wherein said first split-element retarder is a first fixed retarder and wherein said first split-element retarder unit further comprises said first liquid crystal retarder, positioned between said first fixed split-element retarder and said first polarizer, said first liquid crystal retarder having said first orientation parallel to said first polarizer and said second orientation parallel to said first fixed split-element retarder, and wherein second split-element retarder is a second fixed split-element retarder and wherein said second split-element retarder unit further comprises a second liquid crystal retarder, positioned between said second fixed split-element retarder and said second polarizer, said second liquid crystal retarder having a fixed retardance and having an optic axis rotatable between a first orientation parallel to said second polarizer and a second orientation parallel to said second fixed split-element retarder.

29. The split-element filter of claim 28 wherein said first and second liquid crystal retarders are SmC* liquid crystal retarders.

30. The split-element filter of claim 1 wherein said center retarder unit comprises a first passive quarter-wave retarder oriented at $\pm\pi/4$ to said first polarizer, a second passive quarter-wave retarder oriented parallel or perpendicular to said first passive quarter-wave retarder, and said first liquid crystal retarder positioned between said first and second passive quarter-wave retarders, said first liquid crystal retarder having a half-wave retardance and having said optic axis continuously rotatable between said first and second orientations, said center retarder unit further comprising a fixed center retarder positioned between said first split-element retarder unit and said first passive quarter-wave retarder, and oriented parallel or perpendicular to said first polarizer.

31. The split-element filter of claim 30 wherein said first liquid crystal retarder is a SmA* liquid crystal retarder.

32. The split-element filter of claim 1 wherein said center retarder unit comprises a fixed center retarder oriented parallel or perpendicular to said first polarizer, and wherein said first split-element retarder is a first fixed split-element retarder and wherein said first split-element retarder unit further comprises a first passive quarter-wave retarder, positioned between said first polarizer and said first fixed split-element retarder, with optic axis oriented parallel or perpendicular to said first polarizer, and said first liquid crystal retarder positioned between said first polarizer and said first passive quarter-wave retarder, said first liquid crystal retarder having a half-wave retardance and having said optic axis continuously rotatable between said first and second orientations, and wherein said second split-element retarder is a second fixed split-element retarder and wherein said second split-element retarder unit further comprises a second passive quarter-wave retarder, positioned between said second polarizer and said second fixed split-element retarder, with optic axis oriented parallel or perpendicular to said first polarizer, and a second liquid crystal retarder having a half-wave retardance and having a continuously rotatable optic axis, positioned between said second polarizer and said second passive quarter-wave retarder.

33. The split-element filter of claim 32 wherein said first and second liquid crystal retarders are SmA* liquid crystal retarders.

34. The split-element filter of claim 1 wherein said center retarder unit comprises a first center-split-element retarder oriented parallel or perpendicular to said first polarizer, a second center-split-element retarder, of equal retardance to said first center-split-element retarder, oriented parallel or perpendicular to said first polarizer and a center-center retarder, positioned between said first and second center-split-element retarders, and oriented at $\pm\pi/4$ to said first polarizer.

35. The split-element filter of claim 34 wherein said center-center retarder is a half-wave retarder, and wherein said second center-split-element retarder is oriented perpendicular to said first center-split-element retarder.

36. The split-element filter of claim 1 wherein the retardances of said center retarder unit and of said first and second split-element retarders are in a Lyot progression.

37. The split-element filter of claim 1 wherein said second split-element retarder is oriented parallel to said first split-element retarder, and wherein the composite retardance of said center retarder unit is $m\lambda$, an integral number m of full-waves at a design wavelength $\lambda$, and wherein the retardance of each of said first and second split-element retarders is $(2^n m + \frac{1}{4})\lambda$, where n is a whole number.

38. The split-element filter of claim 1 further comprising a third polarizer, oriented at a fixed angle with respect to said first polarizer and positioned on the opposite side of said second polarizer from said second split-element retarder unit, and further comprising a second-stage retarder positioned between said second polarizer and said third polarizer.

39. A double split-element optical filter comprising one or more stages optically coupled in series wherein at least one stage comprises:

a first polarizer;

a second polarizer, oriented parallel or perpendicular to said first polarizer;

a center retarder oriented at $\pm\pi/4$ to said first polarizer, and positioned between said first and second polarizers;

a first inner-split-element retarder, oriented parallel or perpendicular to said first polarizer, and positioned between said first polarizer and said center retarder;

a second inner-split-element retarder, of equal retardance to said first inner-split-element retarder, oriented parallel or perpendicular to said first polarizer, and positioned between said center retarder and said second polarizer;

a first outer-split-element retarder, oriented at $\pm\pi/4$ with respect to said first polarizer, and positioned between said first polarizer and said first inner-split-element retarder; and a second outer-split-element retarder, of equal retardance to said first outer-split-element retarder, oriented at $\pm\pi/4$ with respect to said first polarizer and positioned between said second inner-split-element retarder and said second polarizer.

40. The double split-element filter of claim 39 wherein the retardance of said center retarder is $(m+\frac{1}{4})\lambda$, where m is an integer and $\lambda$ is a design wavelength.

41. The double split-element filter of claim 40 wherein the retardance of each of said first and second inner-split-element retarders is $(2^n m + \frac{1}{2})\lambda$, where n is a whole number.

42. The double split-element filter of claim 41 wherein the retardance of each of said first and second outer-split-element retarders is $(2^p m + \frac{1}{8})\lambda$, where p is a whole number.

43. The double split-element filter of claim 39 wherein said first and second inner-split-element retarders are oriented parallel to each other and wherein said first and second outer-split-element retarders are oriented perpendicular to each other.

44. The double split-element filter of claim 39 wherein said first and second inner-split-element retarders are oriented perpendicular to each other and wherein said first and second outer-split-element retarders are oriented perpendicular to each other.

45. The double split-element filter of claim 39 wherein said first and second inner-split-element retarders are oriented parallel to each other and wherein said first and second outer-split-element retarders are oriented parallel to each other and are perpendicular to said center retarder.

46. The double split-element filter of claim 39 wherein at least one of said retarders is a variable retarder.

47. The double split-element filter of claim 46 wherein said variable retarder is a liquid crystal variable retarder.

48. The double split-element filter of claim 47 wherein said liquid crystal variable retarder is a nematic liquid crystal variable retarder.

49. The double split-element filter of claim 39 wherein at least one of said retarders comprises a fixed retarder and further comprises a smectic liquid crystal retarder with rotatable optic axis.

50. A reflection-mode split-element filter comprising:

a polarizer;

a reflector;

a center retarder unit positioned between said polarizer and said reflector, and comprising one or more retarders and having a composite retardance oriented parallel or perpendicular to said polarizer; and a split-element retarder unit, positioned between said polarizer and said center retarder unit, and comprising a split-element retarder, oriented at $\pm\pi/4$ with respect to said polarizer;

wherein at least one of said retarder units comprises a liquid crystal retarder, said liquid crystal retarder having a fixed retardance and having an optic axis rotatable between a first and a second orientation.

51. A liquid crystal split-element optical filter comprising one or more stages optically coupled in series wherein at least one stage comprises:

a first polarizer;

a second polarizer oriented parallel or perpendicular to said first polarizer;

a center retarder unit positioned between said first and second polarizers, and comprising one or more retarders and having a composite retardance oriented parallel or perpendicular to said first polarizer;

a first split-element retarder unit, positioned between said first polarizer and said center retarder unit, and comprising a first split-element retarder, oriented at $\pm\pi/4$ with respect to said first polarizer;

a second split-element retarder unit, positioned between said center retarder unit and said second polarizer, and comprising a second split-element retarder of equal retardance to said first split-element retarder and oriented at $\pm\pi/4$ with respect to said first polarizer; and a liquid crystal means, positioned between said second split-element retarder unit and said second polarizer, for adding a half-wave of retardance and thereby reversing the locations of transmission maxima and minima;

wherein at least one of said retarder units comprises a first liquid crystal retarder, said first liquid crystal retarder having a fixed retardance and having an optic axis rotatable between a first orientation and a second orientation.

* * * * *